United States Patent
Choi et al.

(10) Patent No.: US 10,251,048 B2
(45) Date of Patent: Apr. 2, 2019

(54) METHOD FOR PERFORMING SCANNING IN WIRELESS COMMUNICATION SYSTEM, AND APPARATUS THEREFOR

(71) Applicant: LG ELECTRONICS INC., Seoul (KR)

(72) Inventors: Jingu Choi, Seoul (KR); Hyeonjae Lee, Seoul (KR); Minsoo Lee, Seoul (KR); Younghwan Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/566,067

(22) PCT Filed: Apr. 12, 2016

(86) PCT No.: PCT/KR2016/003837
§ 371 (c)(1),
(2) Date: Oct. 12, 2017

(87) PCT Pub. No.: WO2016/167539
PCT Pub. Date: Oct. 20, 2016

(65) Prior Publication Data
US 2018/0132092 A1 May 10, 2018

Related U.S. Application Data

(60) Provisional application No. 62/146,931, filed on Apr. 13, 2015.

(51) Int. Cl.
*H04W 4/00* (2018.01)
*H04W 8/00* (2009.01)
(Continued)

(52) U.S. Cl.
CPC ............ *H04W 8/005* (2013.01); *H04W 4/80* (2018.02); *H04W 8/00* (2013.01); *H04W 48/16* (2013.01); *H04W 4/50* (2018.02); *Y02D 70/10* (2018.01)

(58) Field of Classification Search
CPC ....... H04W 8/005; H04W 48/16; H04W 8/00; H04W 4/00
(Continued)

(56) References Cited

U.S. PATENT DOCUMENTS

| | | | |
|---|---|---|---|
| 6,175,649 B1 * | 1/2001 | Kiyohara | H04N 1/0402 358/453 |
| 7,215,923 B2 * | 5/2007 | Hillyard | H04W 8/005 455/41.1 |

(Continued)

FOREIGN PATENT DOCUMENTS

| | | |
|---|---|---|
| WO | WO2012/060611 A2 | 5/2012 |
| WO | WO 2015/002385 A1 | 1/2015 |
| WO | WO 2015/030521 A1 | 3/2015 |

*Primary Examiner* — Marceau Milord
(74) *Attorney, Agent, or Firm* — Birch, Stewart, Kolasch & Birch, LLP

(57) ABSTRACT

The present specification relates to a method for performing, by a first device, scanning in a wireless communication system, comprising the steps of: receiving a scan request which orders at least one neighboring device to perform scanning; and performing the scan negotiation procedure with a second device. According to the present specification, it is possible to enable a device with an insufficient energy source to perform a scanning function at lower power than a conventional wireless communication technique by performing a search function by another device.

12 Claims, 34 Drawing Sheets

(51) Int. Cl.
*H04W 48/16* (2009.01)
*H04W 4/80* (2018.01)
*H04W 4/50* (2018.01)

(58) Field of Classification Search
USPC ...................................... 455/434, 41.1, 41.2
See application file for complete search history.

(56) References Cited

U.S. PATENT DOCUMENTS

| | | | | |
|---|---|---|---|---|
| 8,769,304 B2* | 7/2014 | Kirsch | ............... | G06Q 20/0855 380/30 |
| 9,338,638 B1* | 5/2016 | Palin | ..................... | H04W 4/008 |
| 9,369,947 B2* | 6/2016 | Lee | ..................... | H04W 48/16 |
| 9,706,383 B2* | 7/2017 | Kiukkonen | ............. | H04W 8/00 |
| 9,800,429 B2* | 10/2017 | Crayford | ............. | H04L 12/2803 |
| 9,888,504 B2* | 2/2018 | Lee | ..................... | H04W 76/021 |
| 9,936,372 B2* | 4/2018 | Lee | ....................... | H04W 76/14 |
| 9,961,531 B2* | 5/2018 | Choi | ..................... | H04W 8/005 |
| 2006/0106753 A1 | 5/2006 | Yoon et al. | | |
| 2006/0165035 A1* | 7/2006 | Chandra | ............... | H04W 28/16 370/329 |
| 2010/0136953 A1* | 6/2010 | Twell | ..................... | H04W 4/00 455/414.1 |
| 2010/0262829 A1* | 10/2010 | Brown | .................. | H04L 63/061 713/171 |
| 2011/0082940 A1* | 4/2011 | Montemurro | ....... | H04W 76/023 709/227 |
| 2011/0225305 A1 | 9/2011 | Vedantham et al. | | |
| 2013/0316649 A1* | 11/2013 | Newham | ............... | H04W 88/04 455/41.2 |
| 2014/0188348 A1* | 7/2014 | Gautama | ............... | B60W 10/30 701/48 |
| 2016/0212147 A1* | 7/2016 | Palin | ..................... | H04L 63/062 |
| 2016/0212194 A1* | 7/2016 | Palin | ..................... | G06F 3/0484 |
| 2017/0372600 A1* | 12/2017 | Palin | ..................... | H04L 67/025 |
| 2018/0032997 A1* | 2/2018 | Gordon | ............. | G06Q 20/3224 |

* cited by examiner

[FIG. 1]
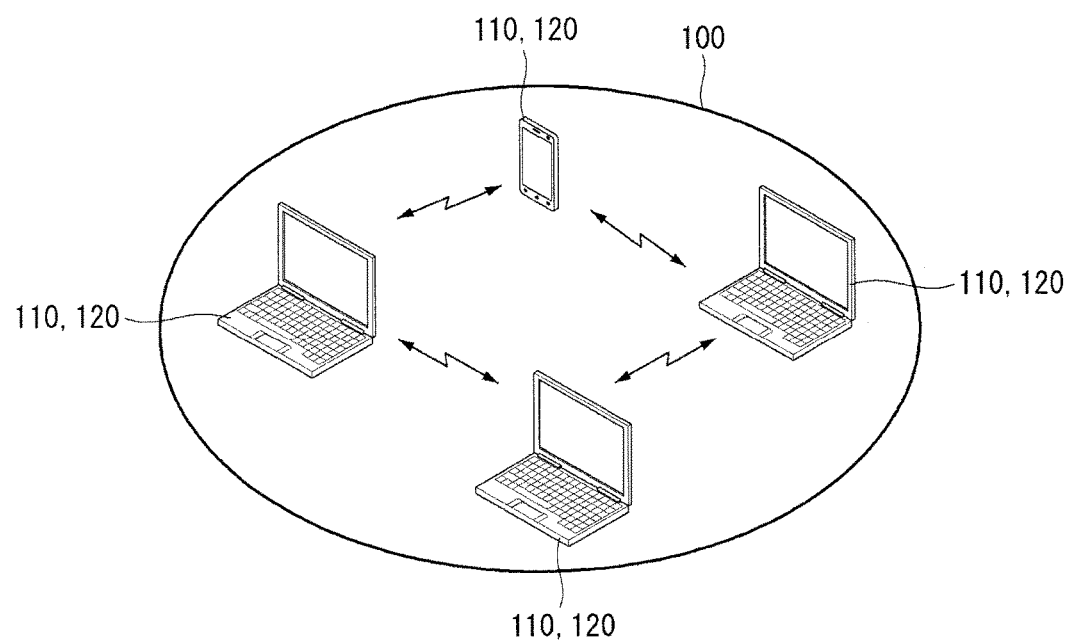

[FIG. 2]
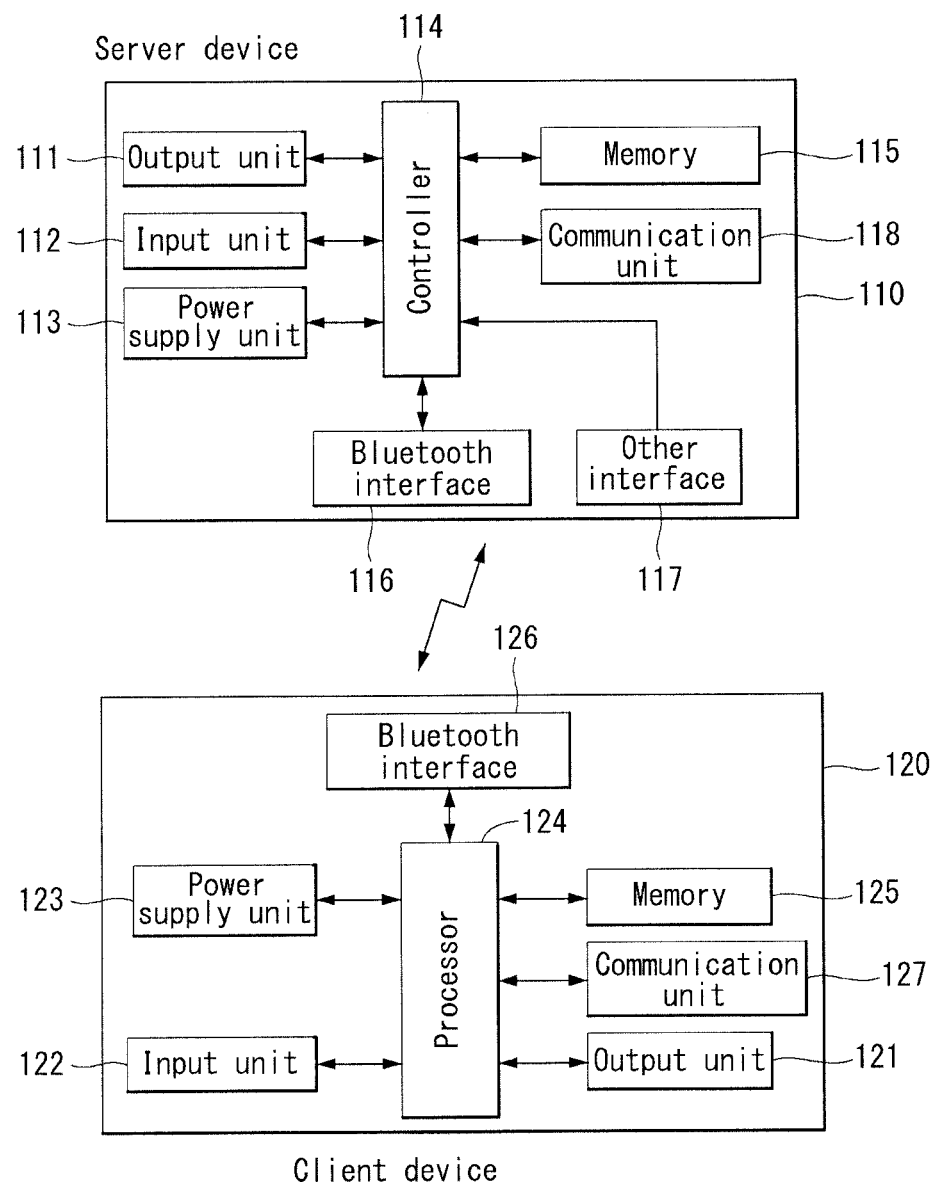

[FIG. 3]
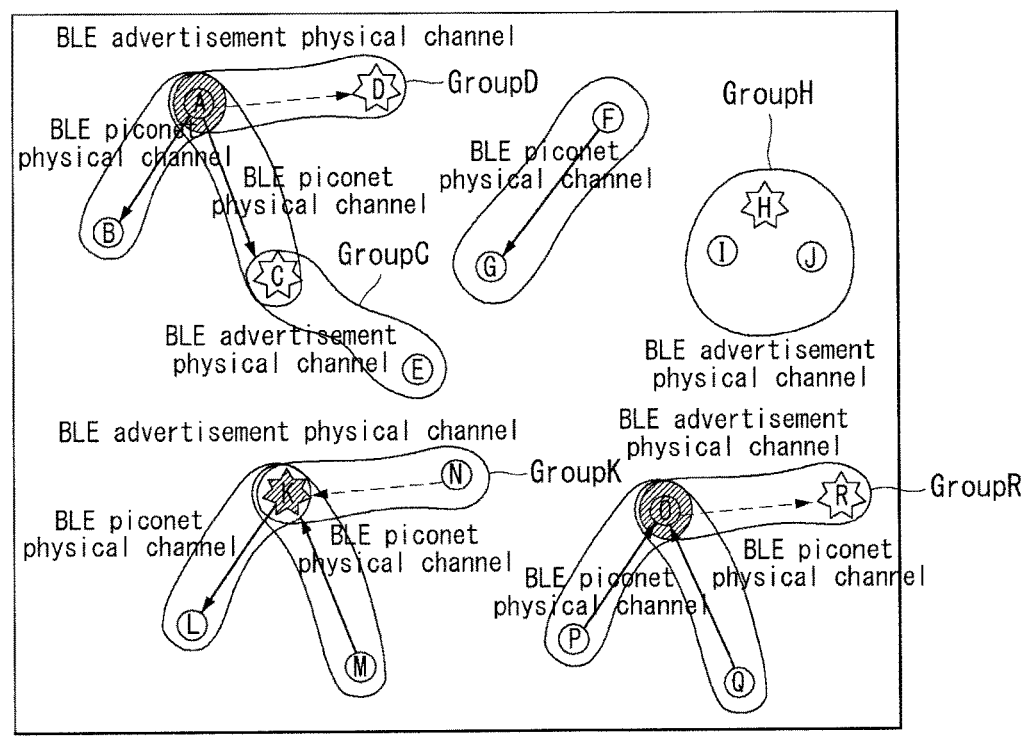

[FIG. 4]
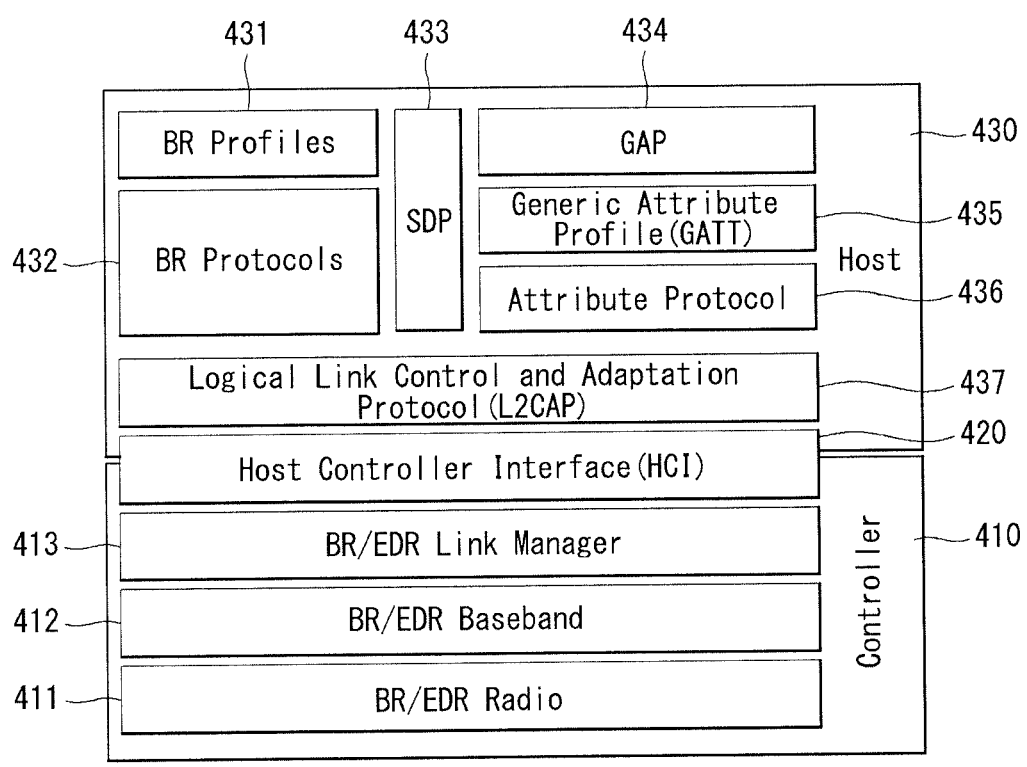

[FIG. 5]
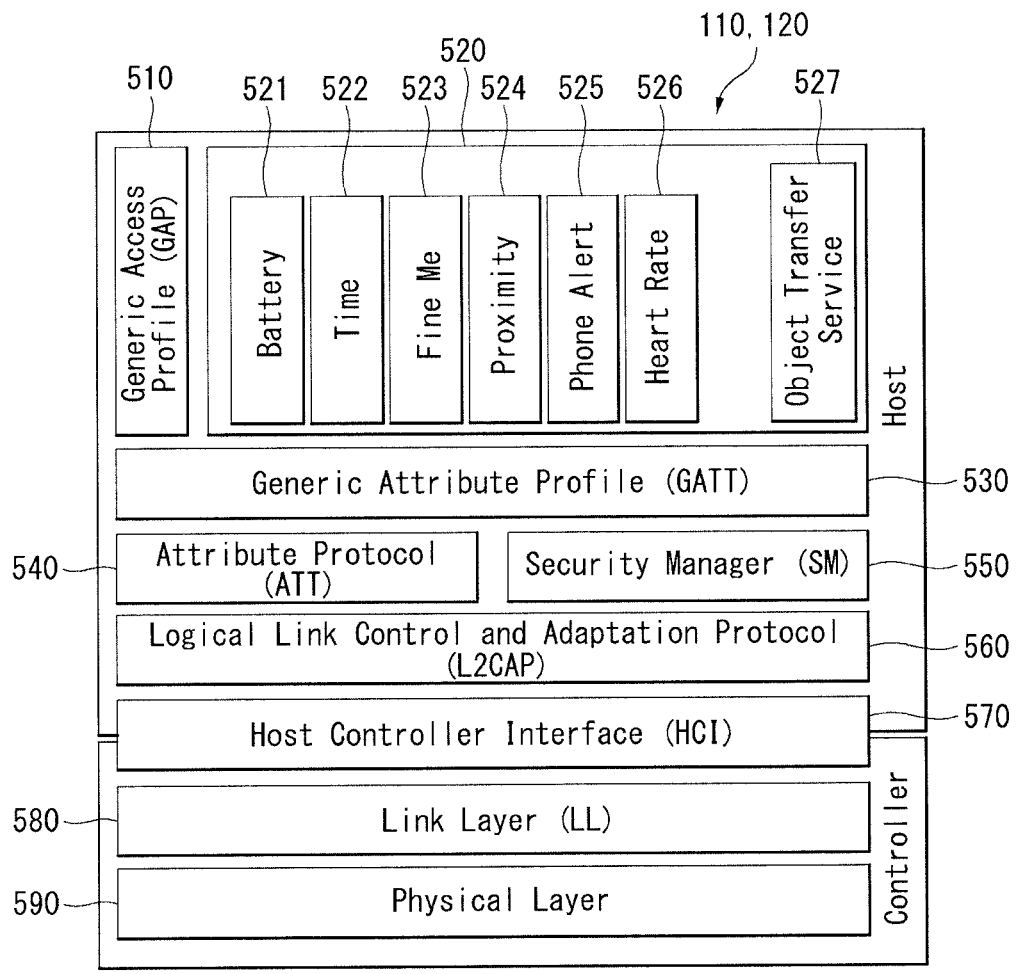

[FIG. 6]
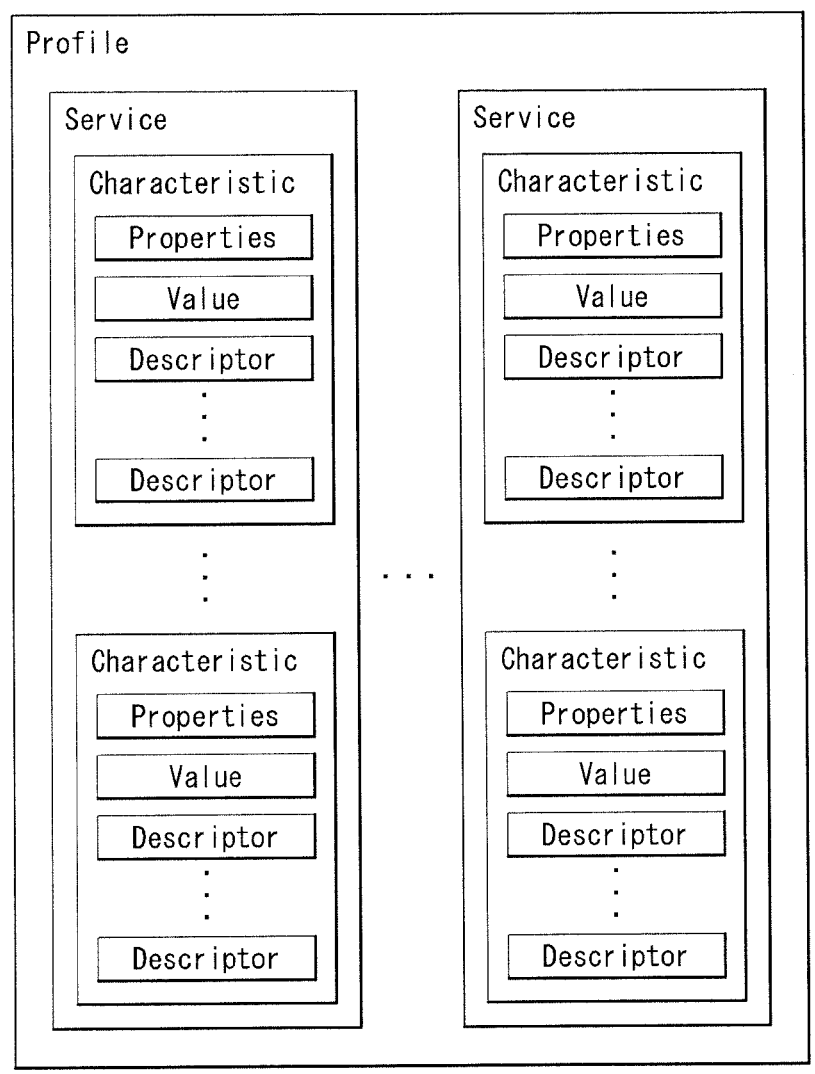

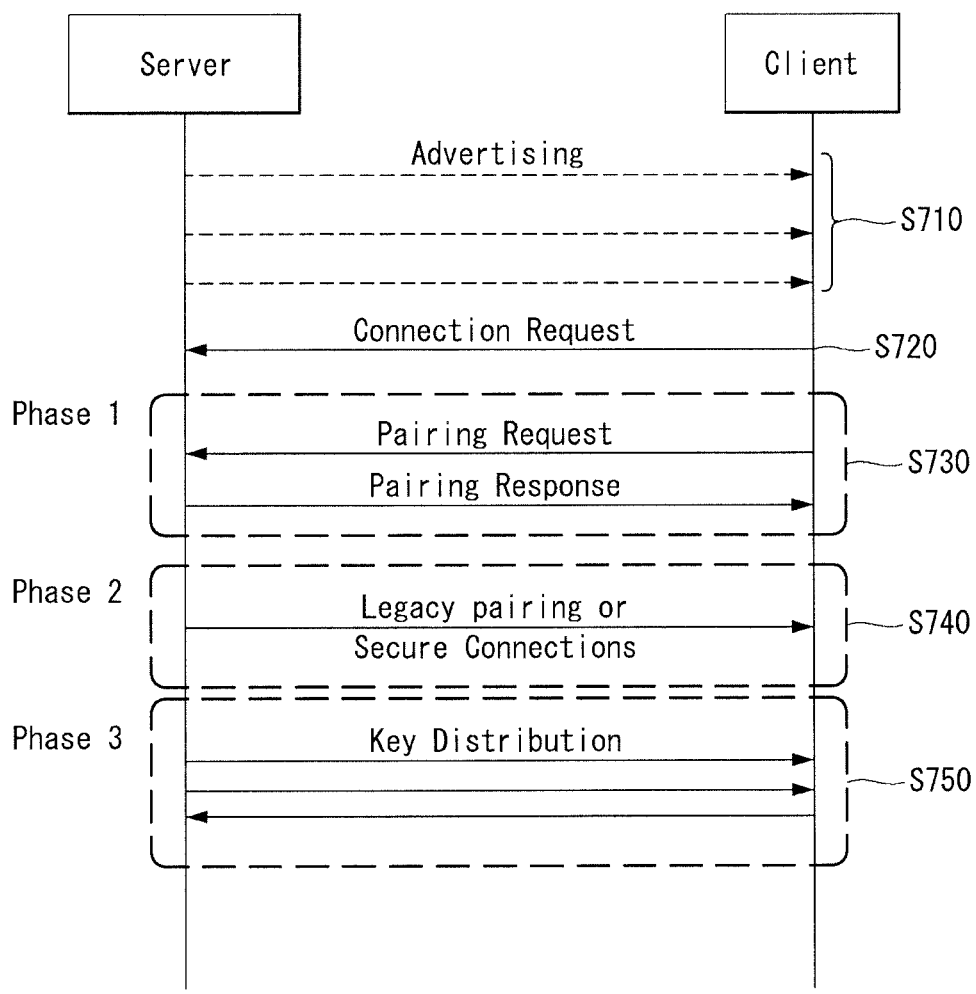
[FIG. 7]

[FIG. 8]
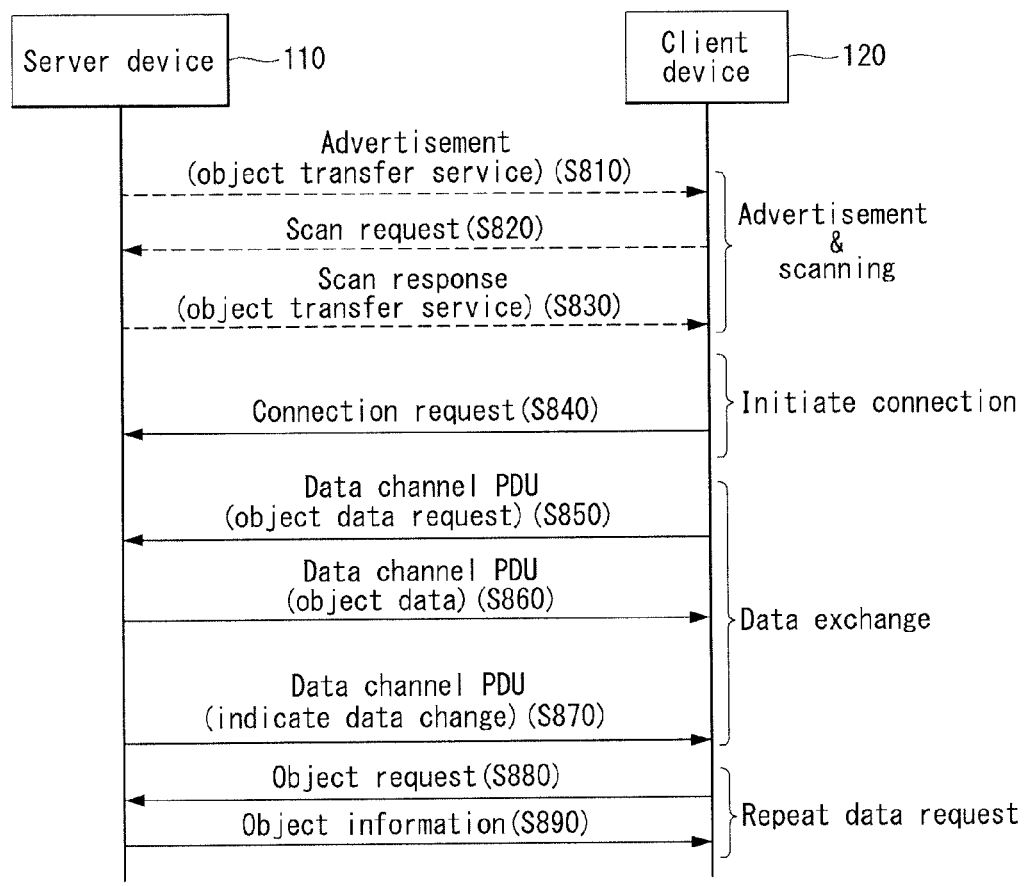

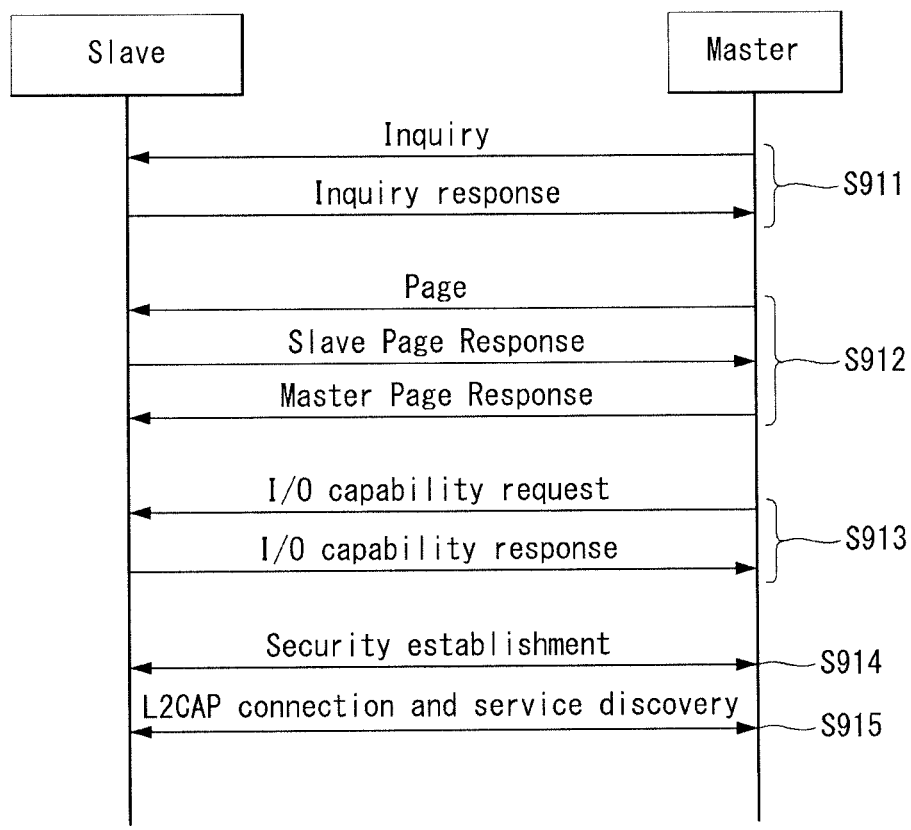
[FIG. 9]

[FIG. 10]
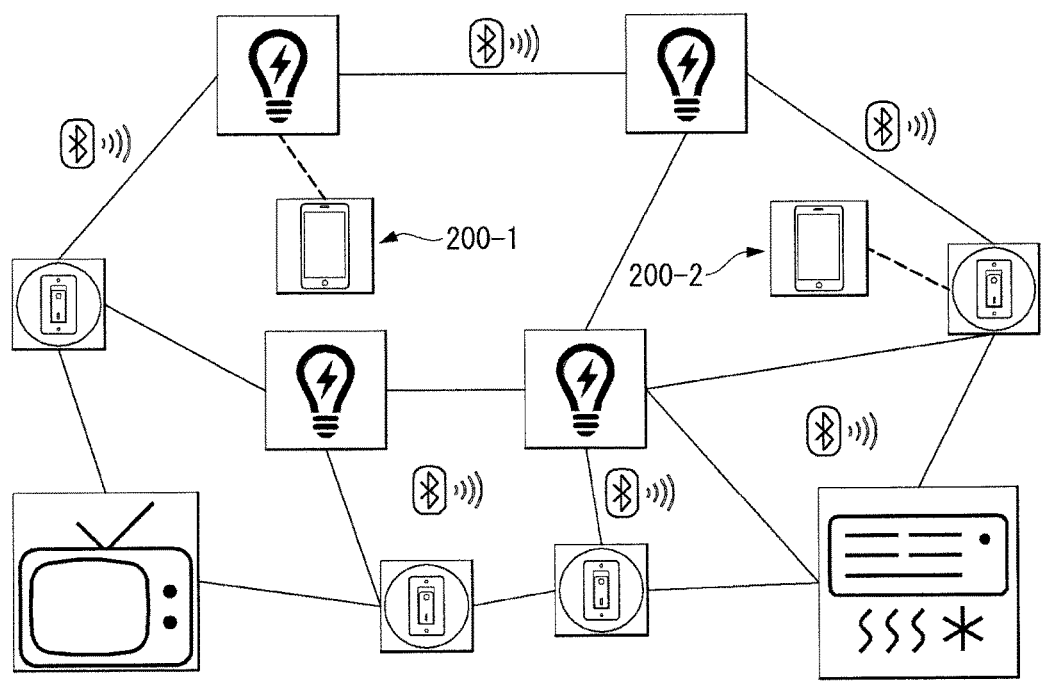

[FIG. 11]
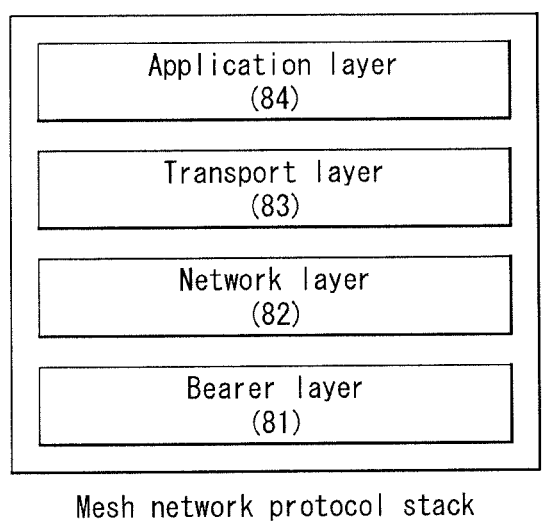
Mesh network protocol stack

[FIG. 12]
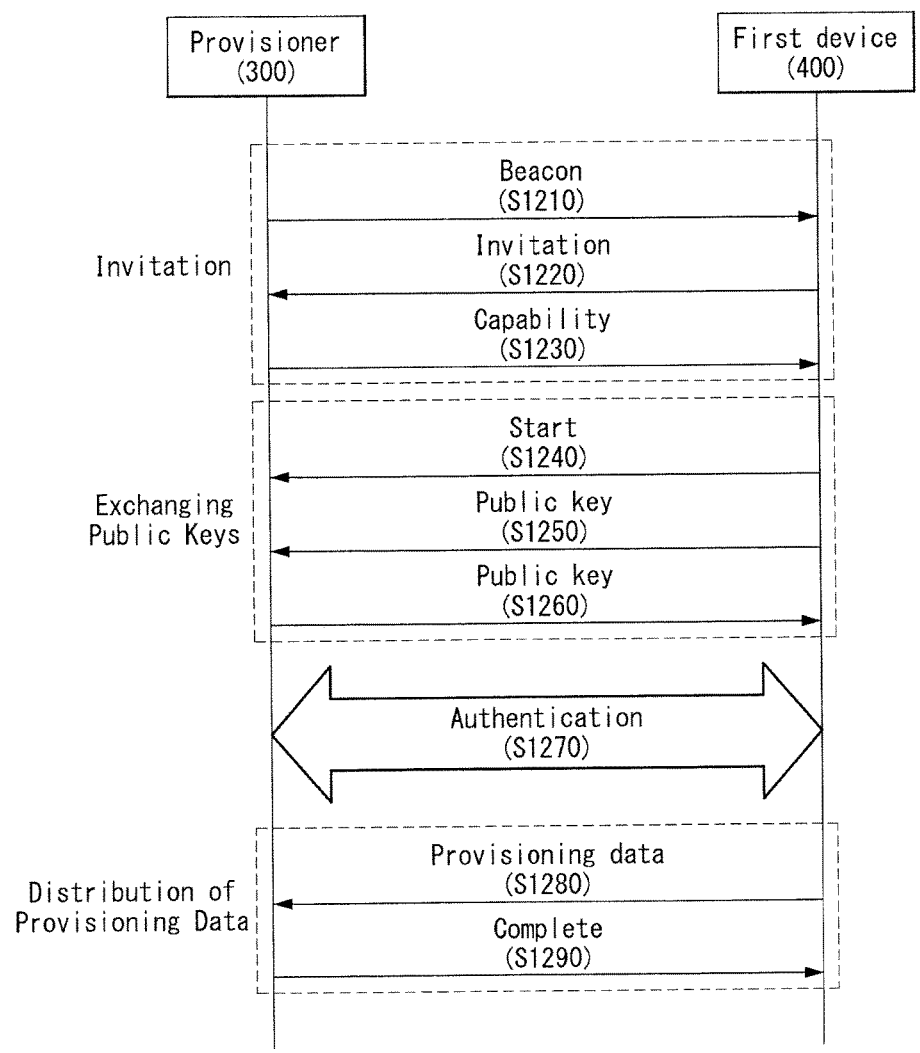

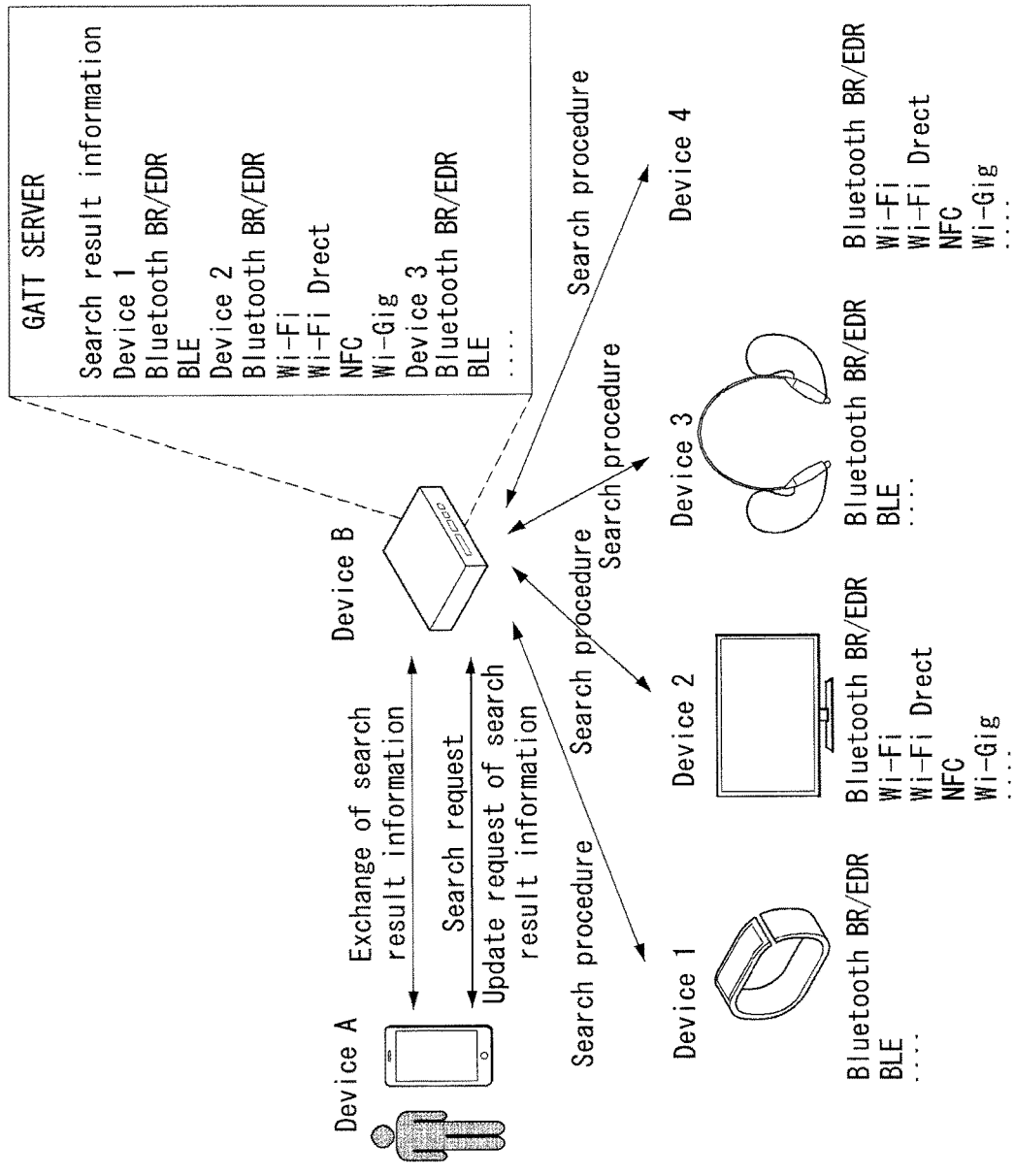
[FIG. 13]

[FIG. 14]
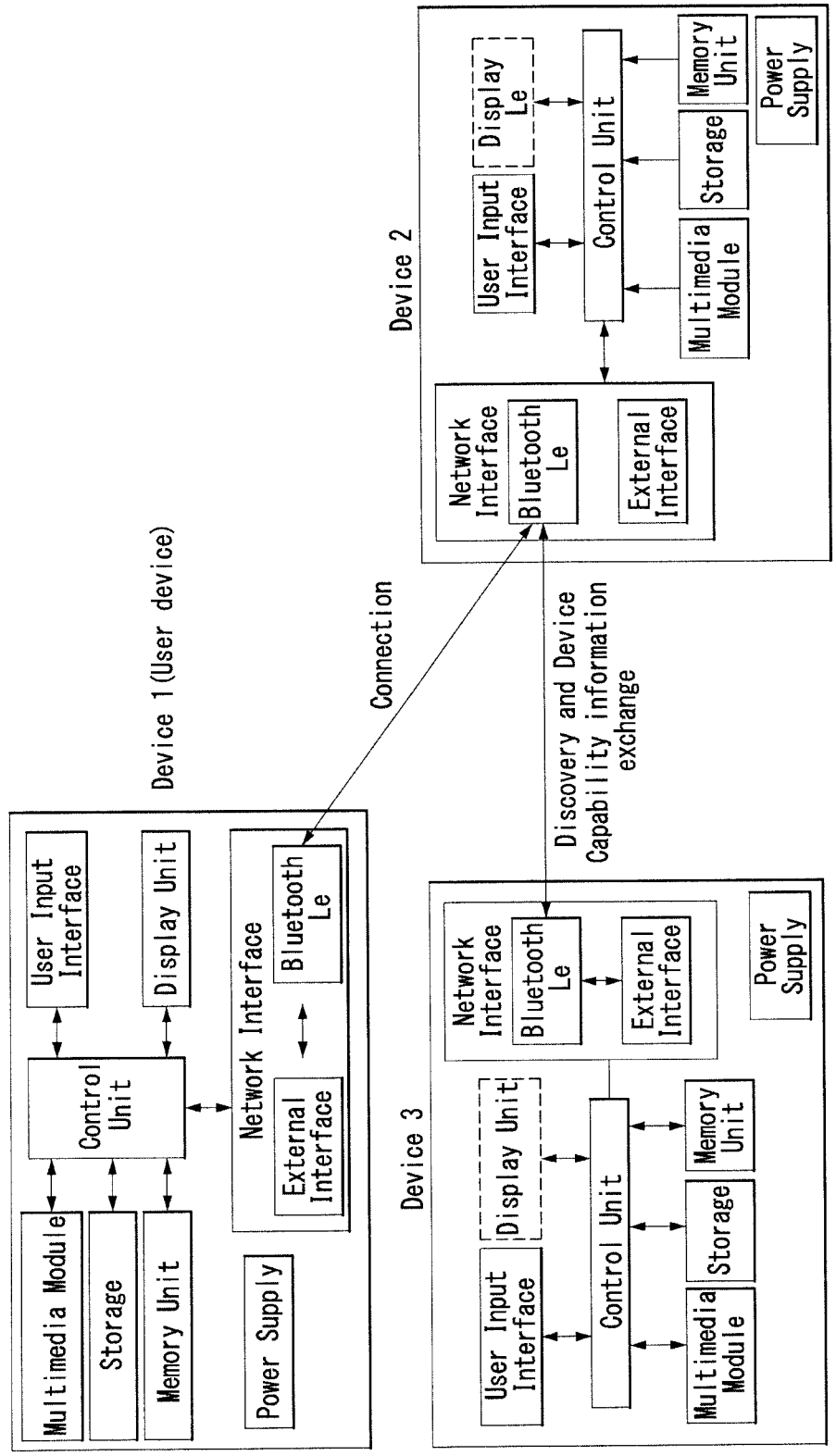

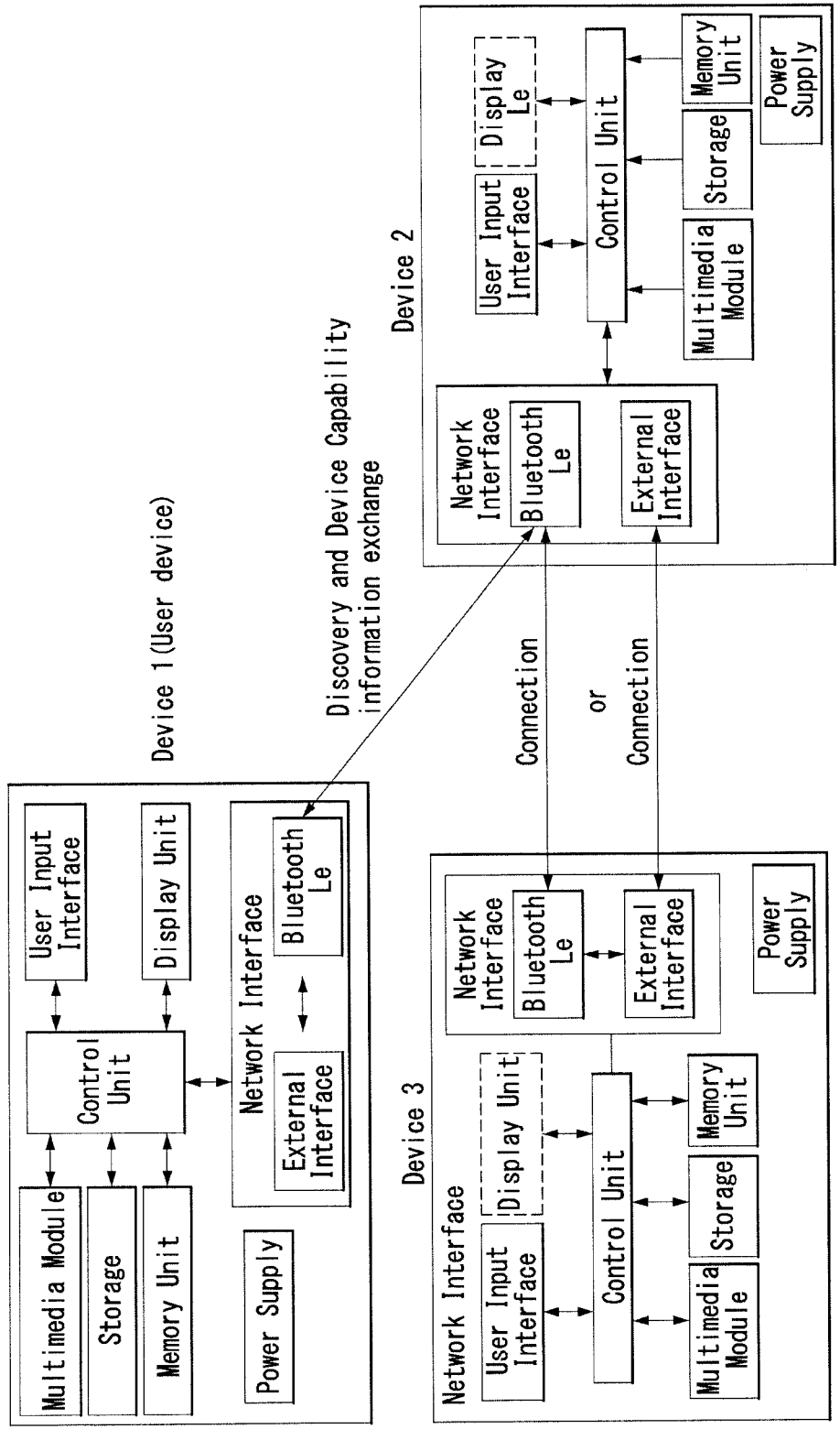
[FIG. 15]

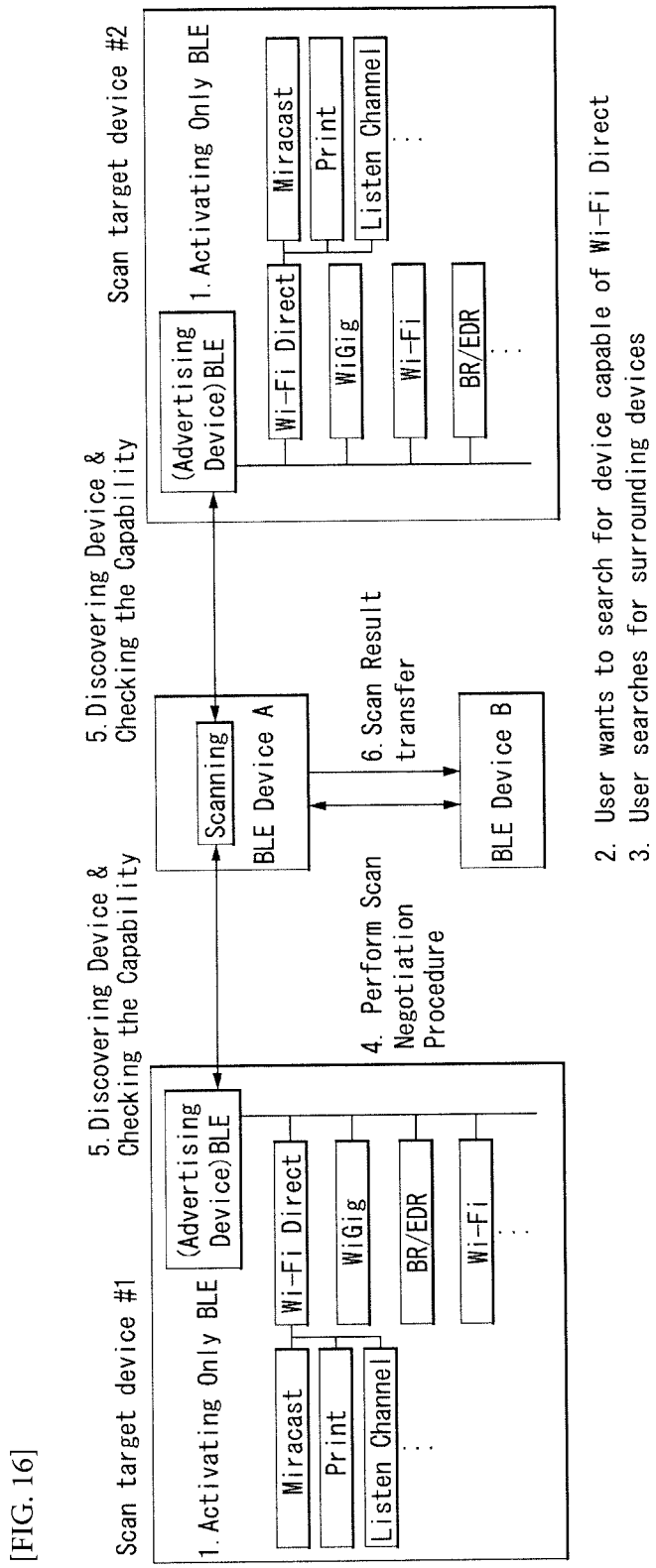
[FIG. 16]

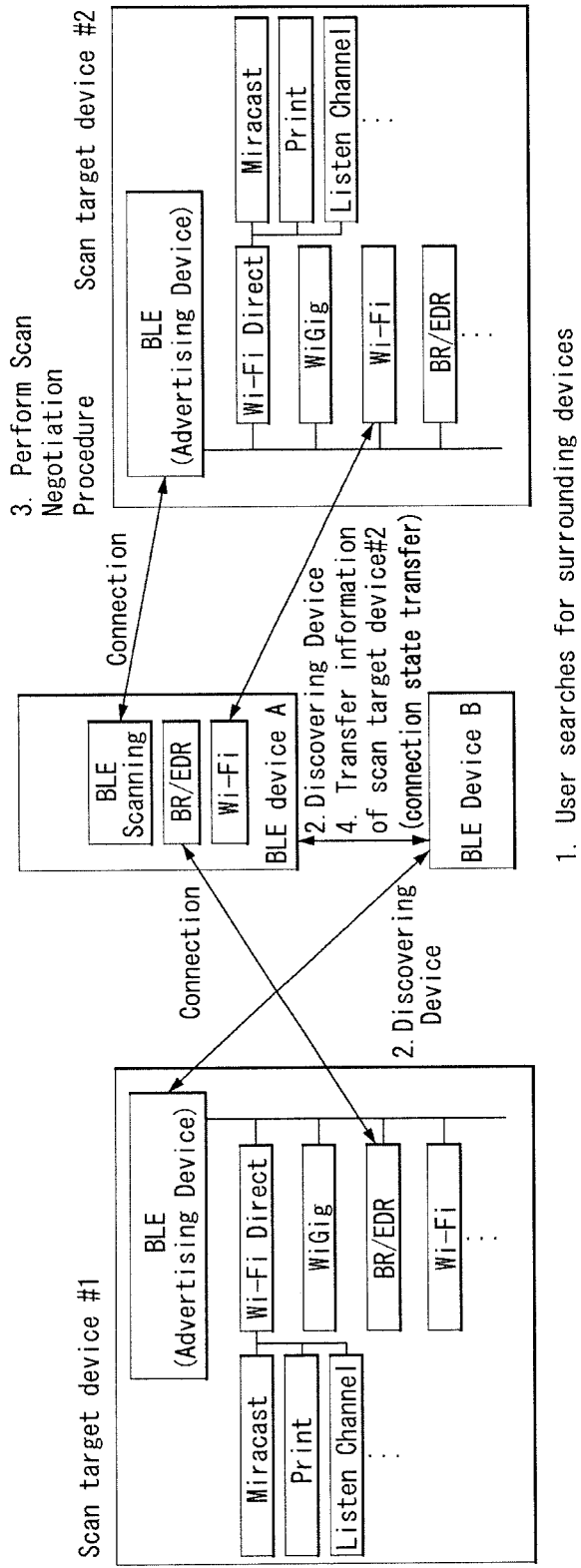
[FIG. 17]

[FIG. 18]
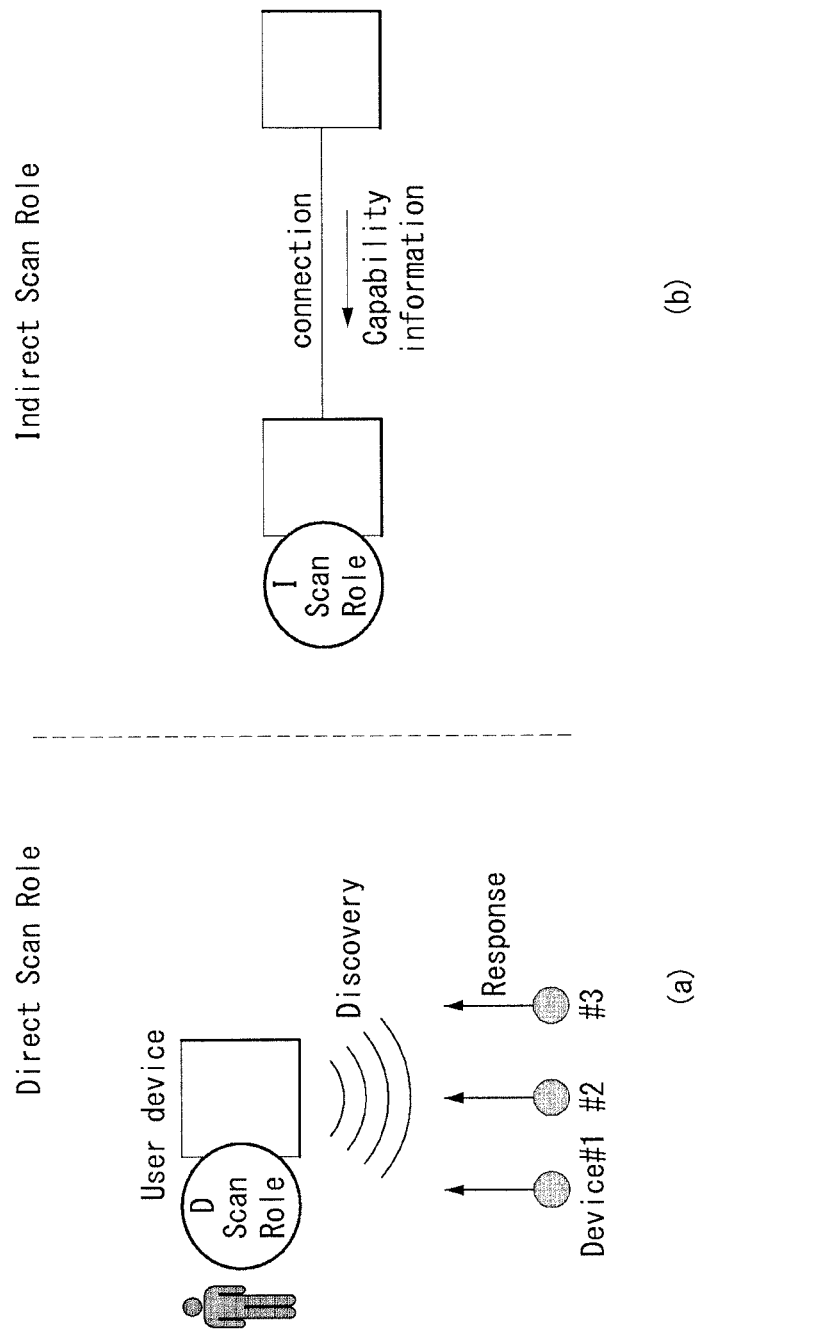

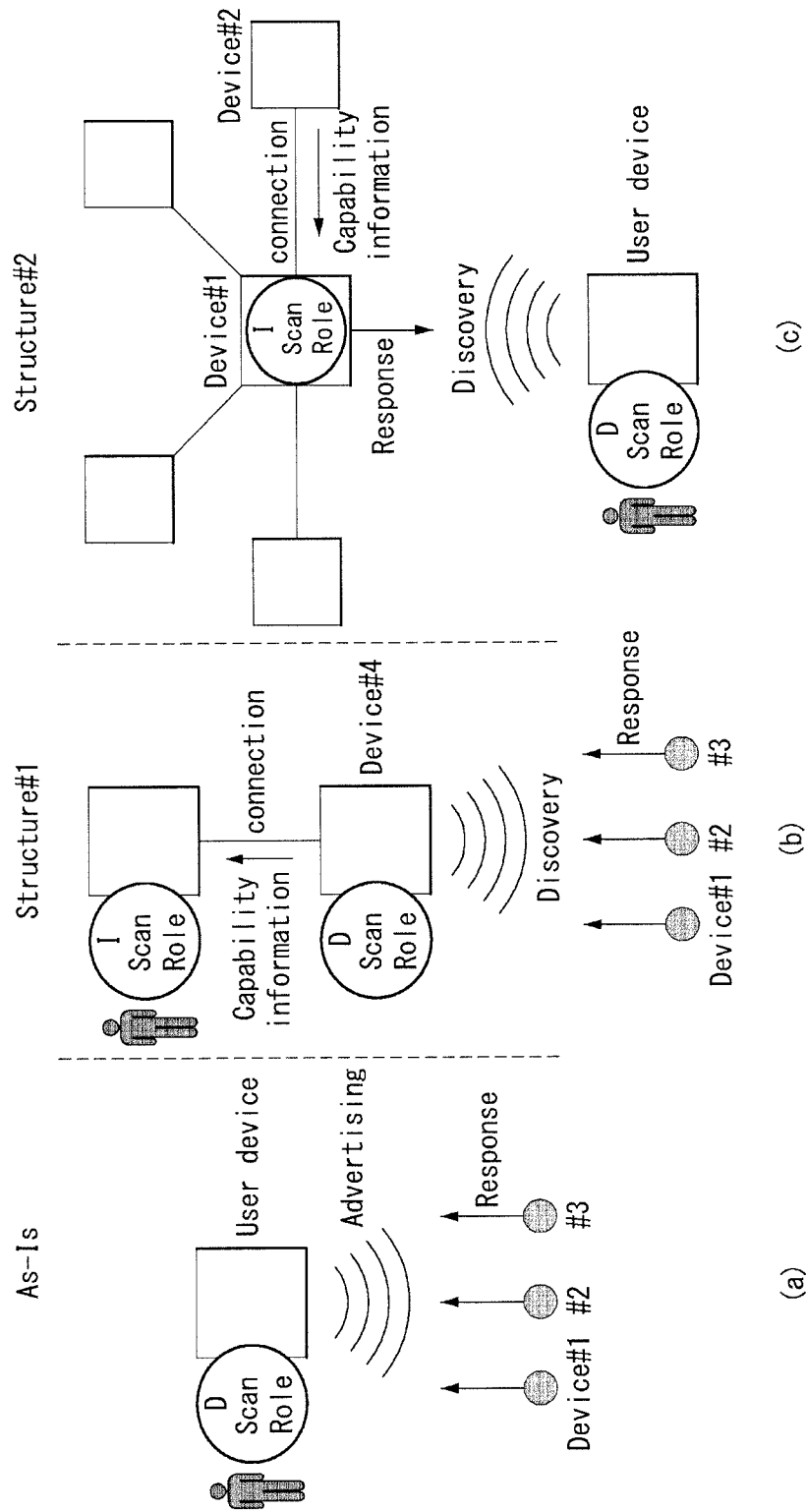
[FIG. 19]

[FIG. 20]
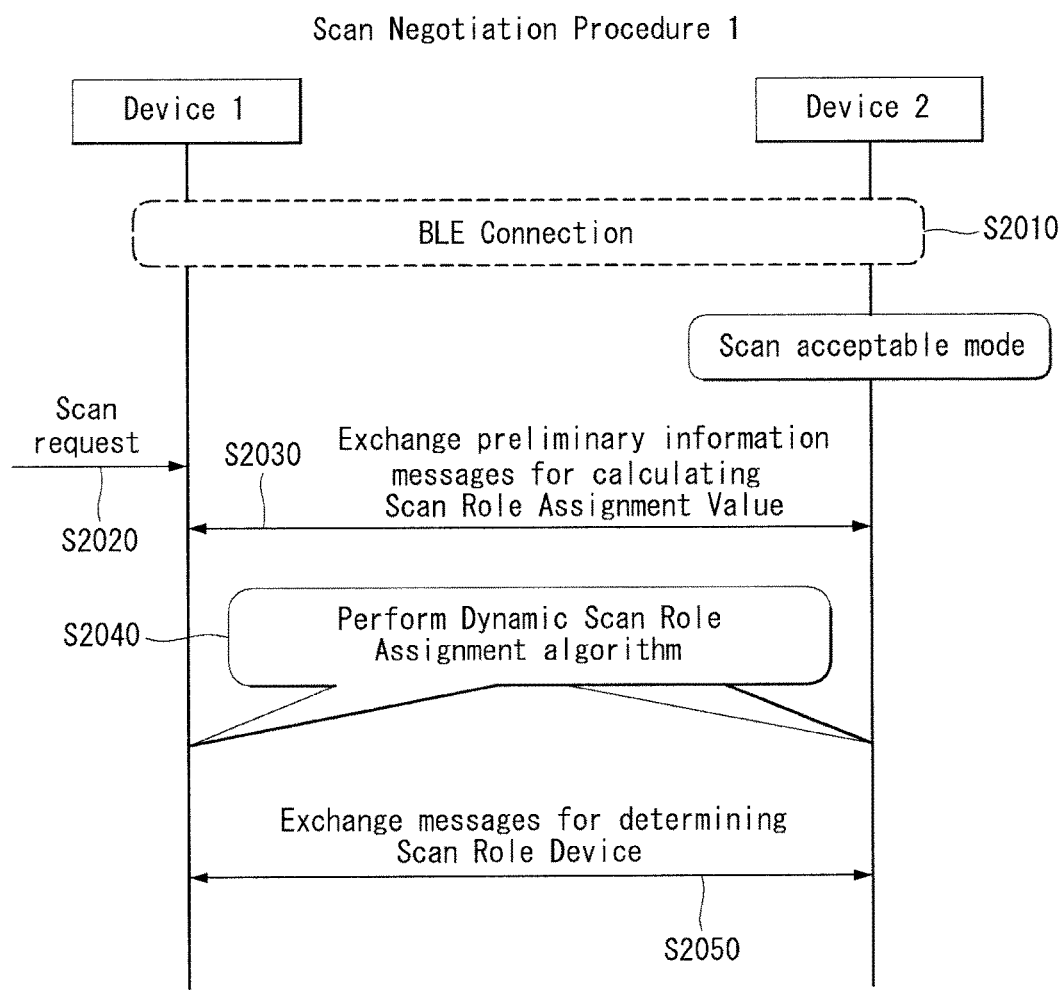

[FIG. 21]
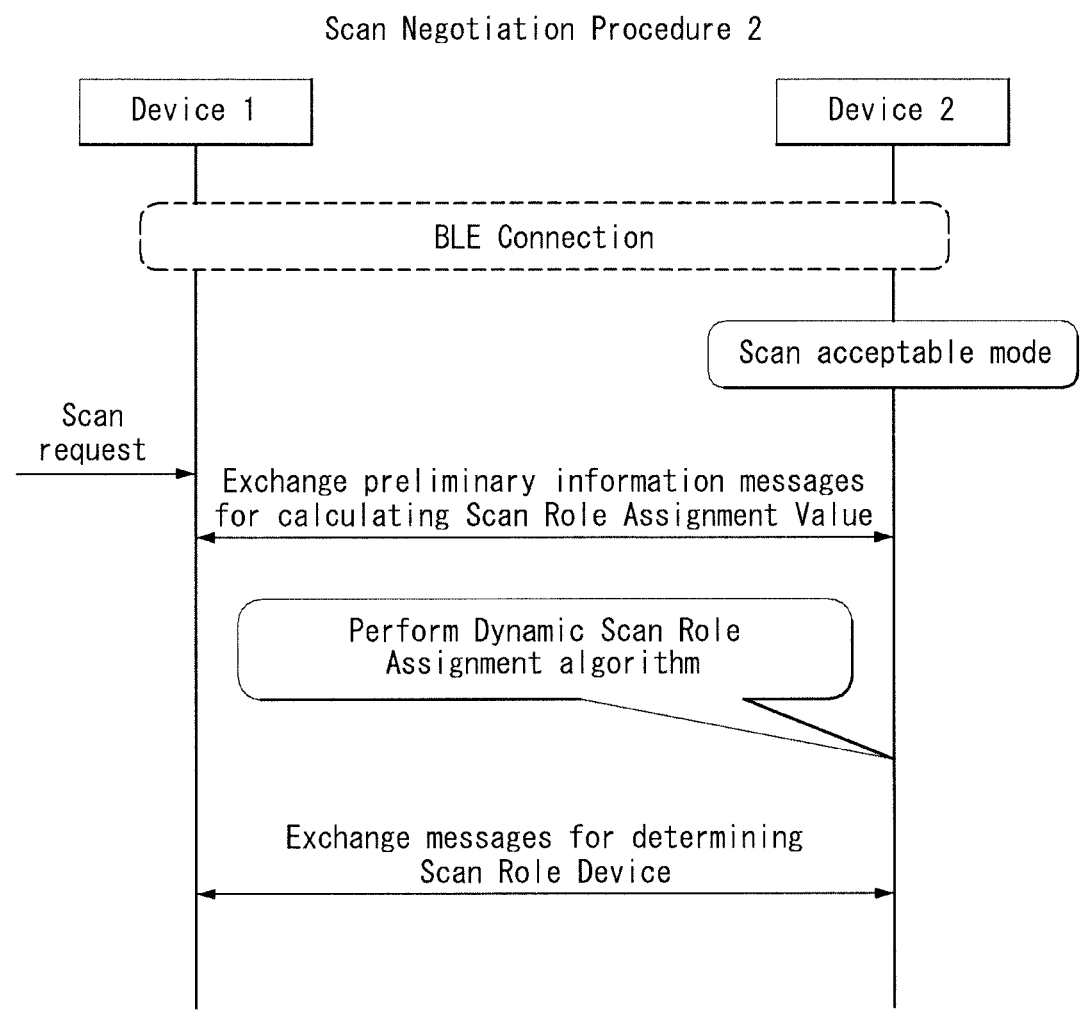

[FIG. 22]
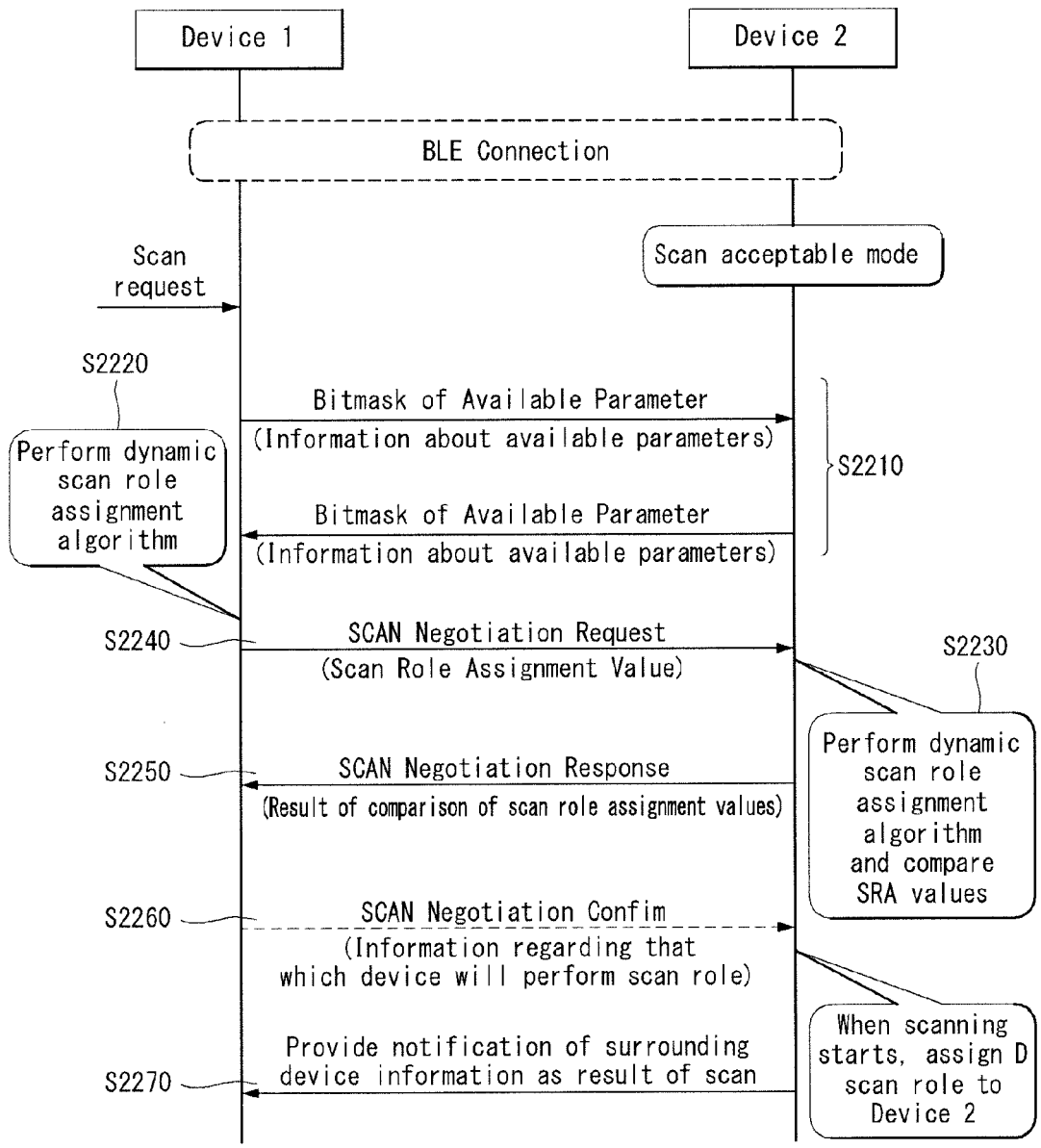

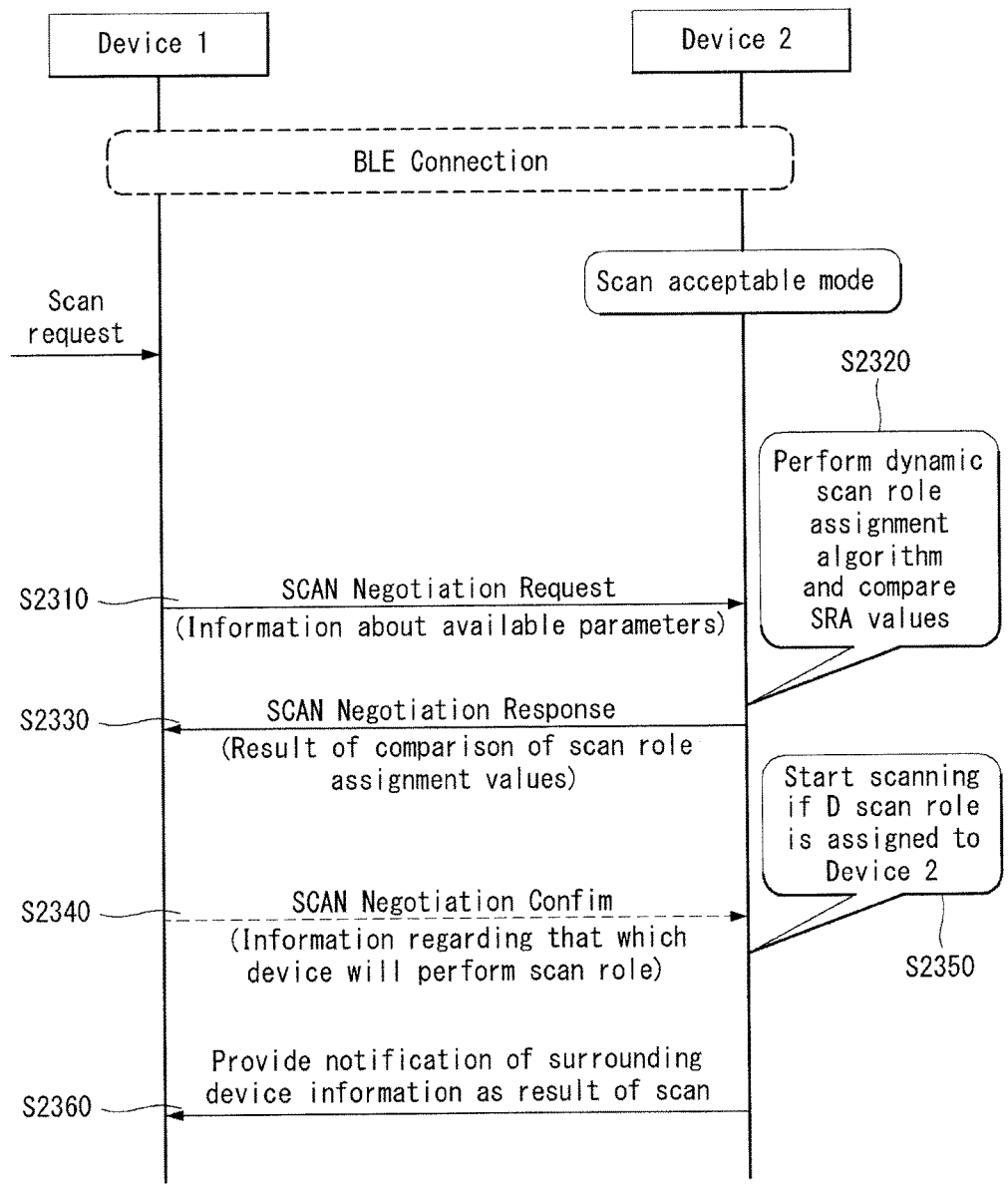
[FIG. 23]

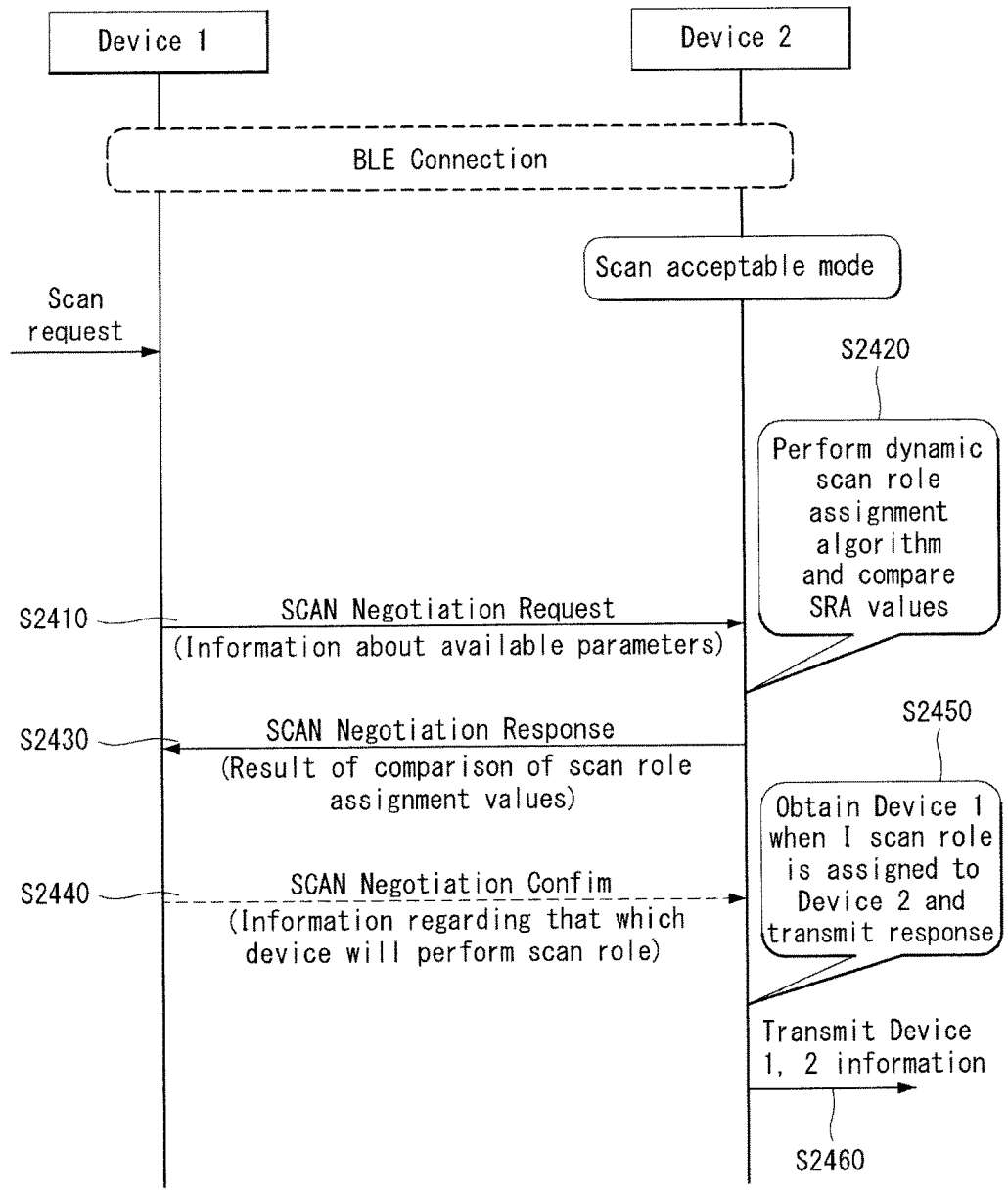

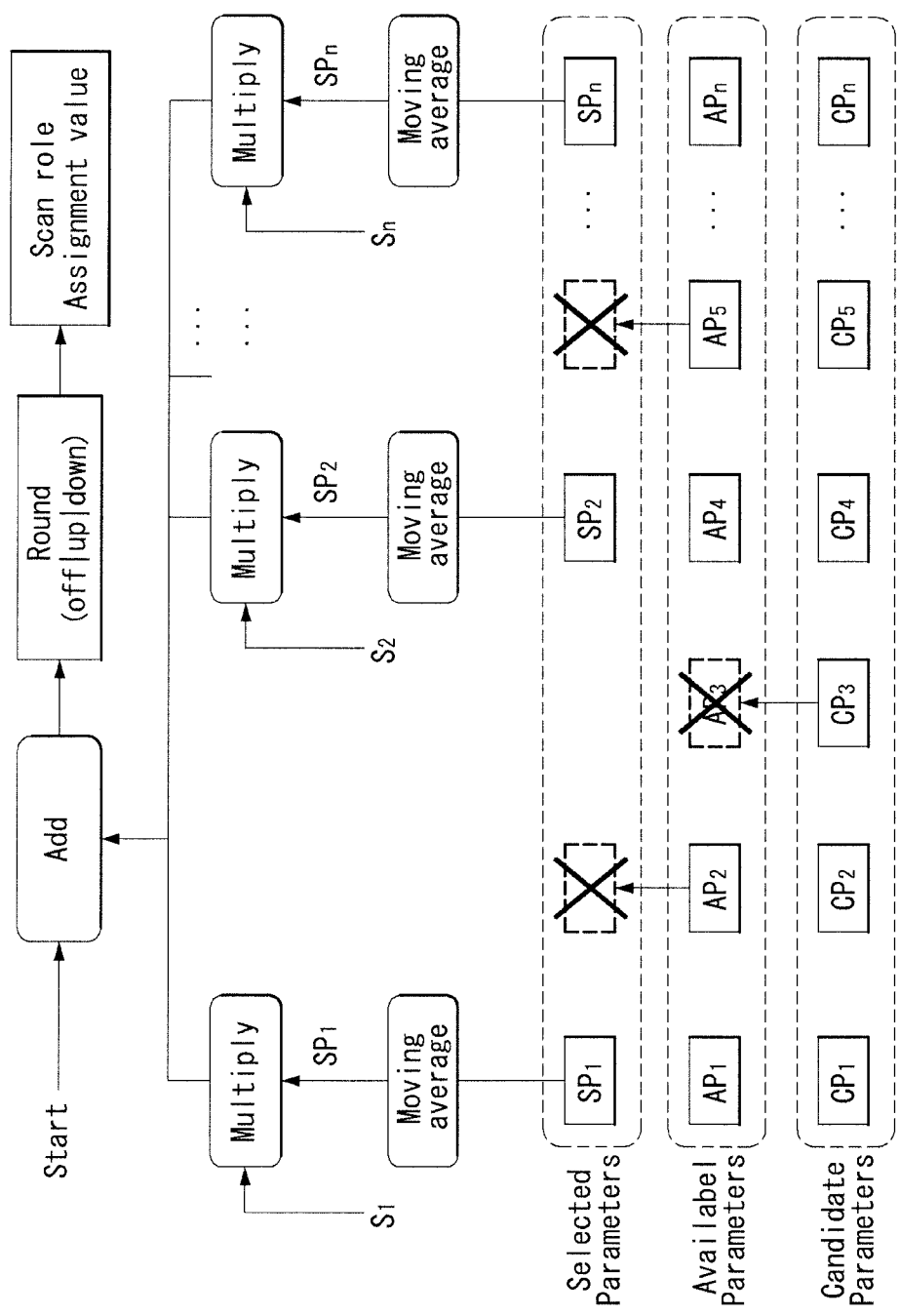
[FIG. 25]

[FIG. 26]
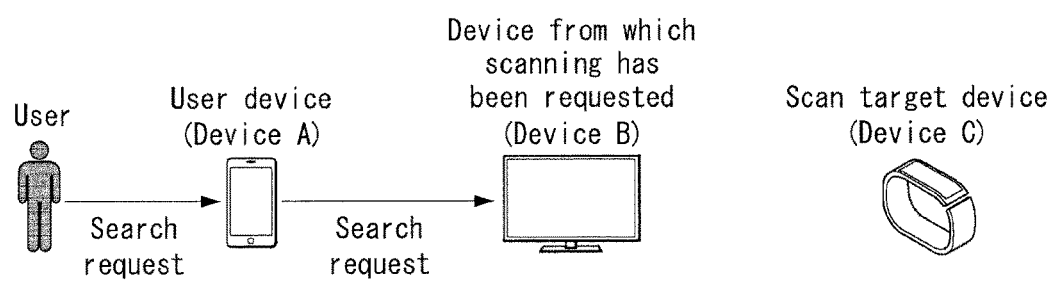

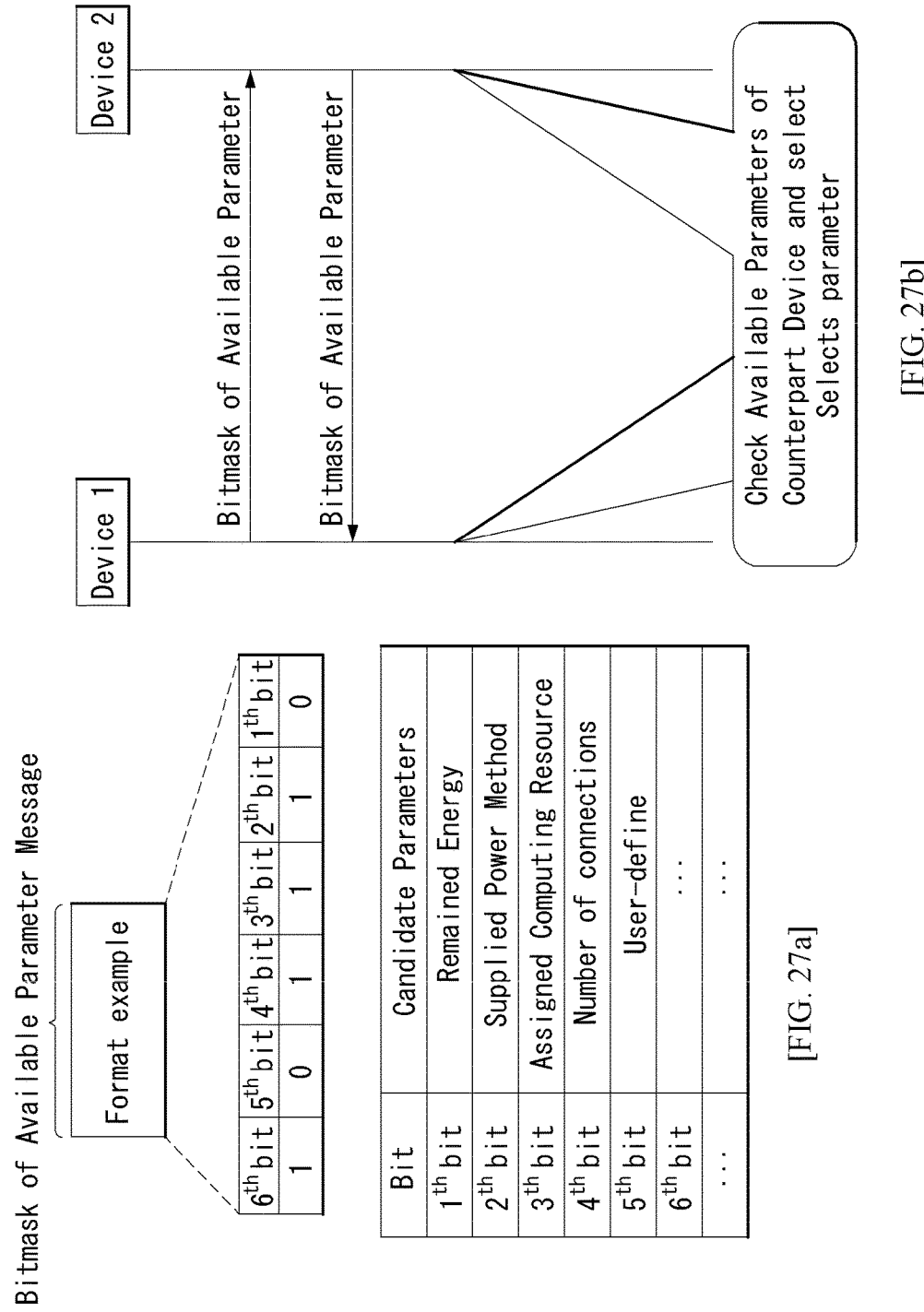

[FIG. 28]
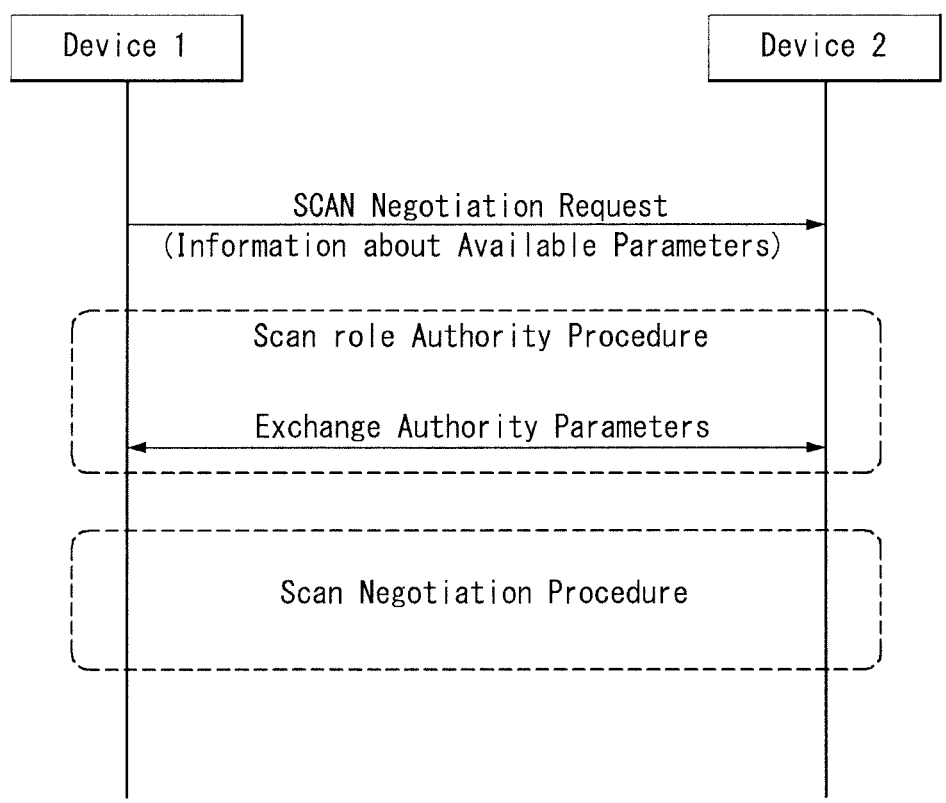

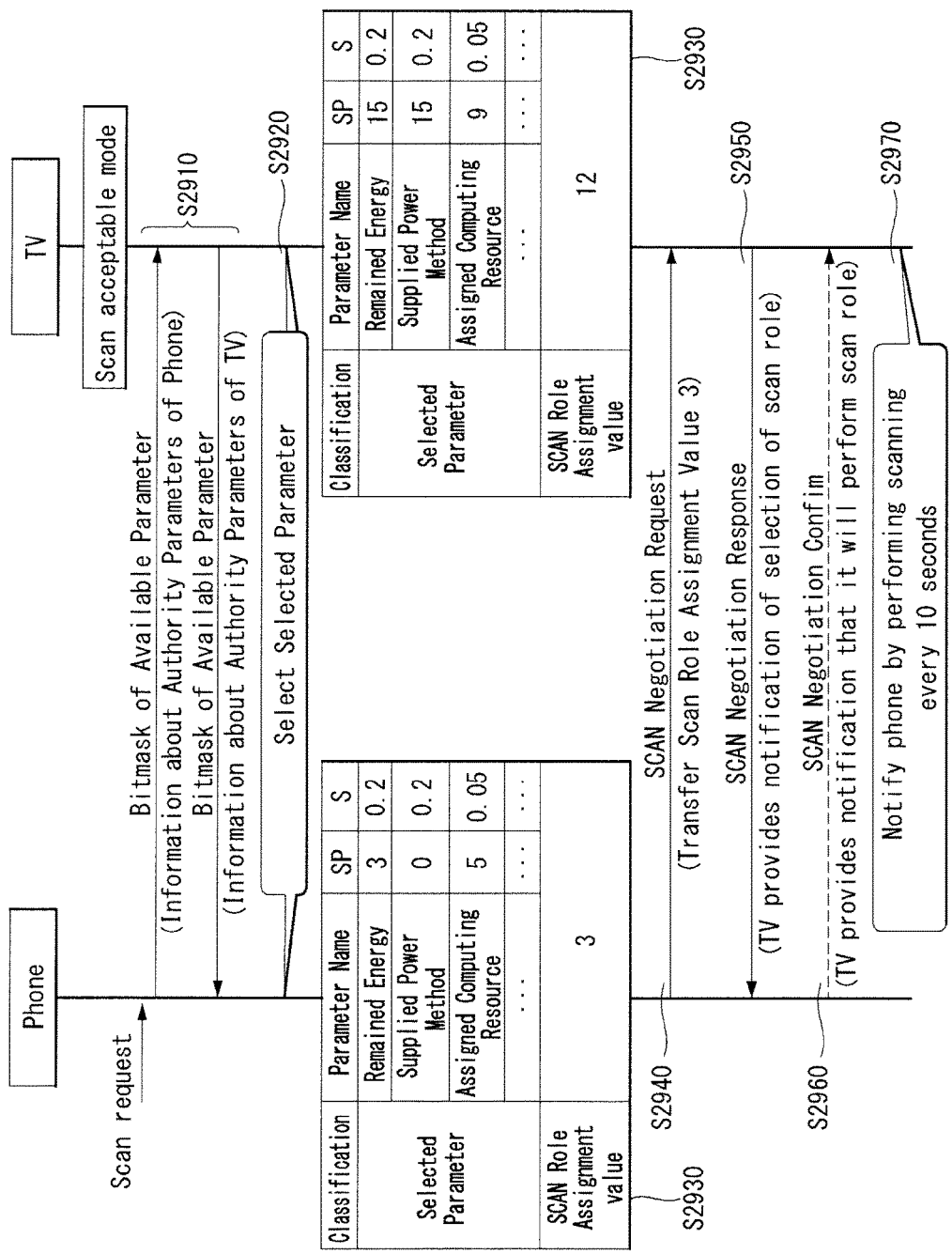
[FIG. 29]

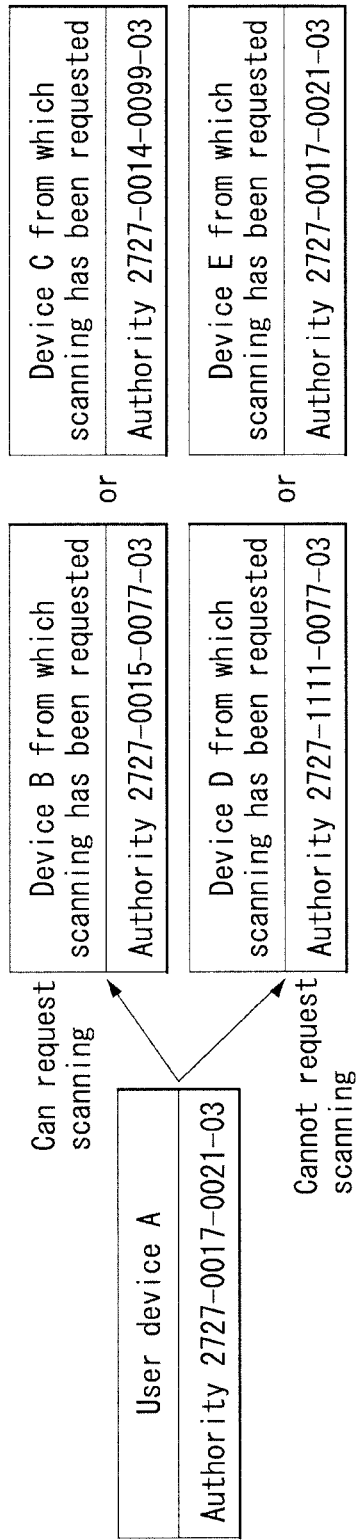
[FIG. 30]

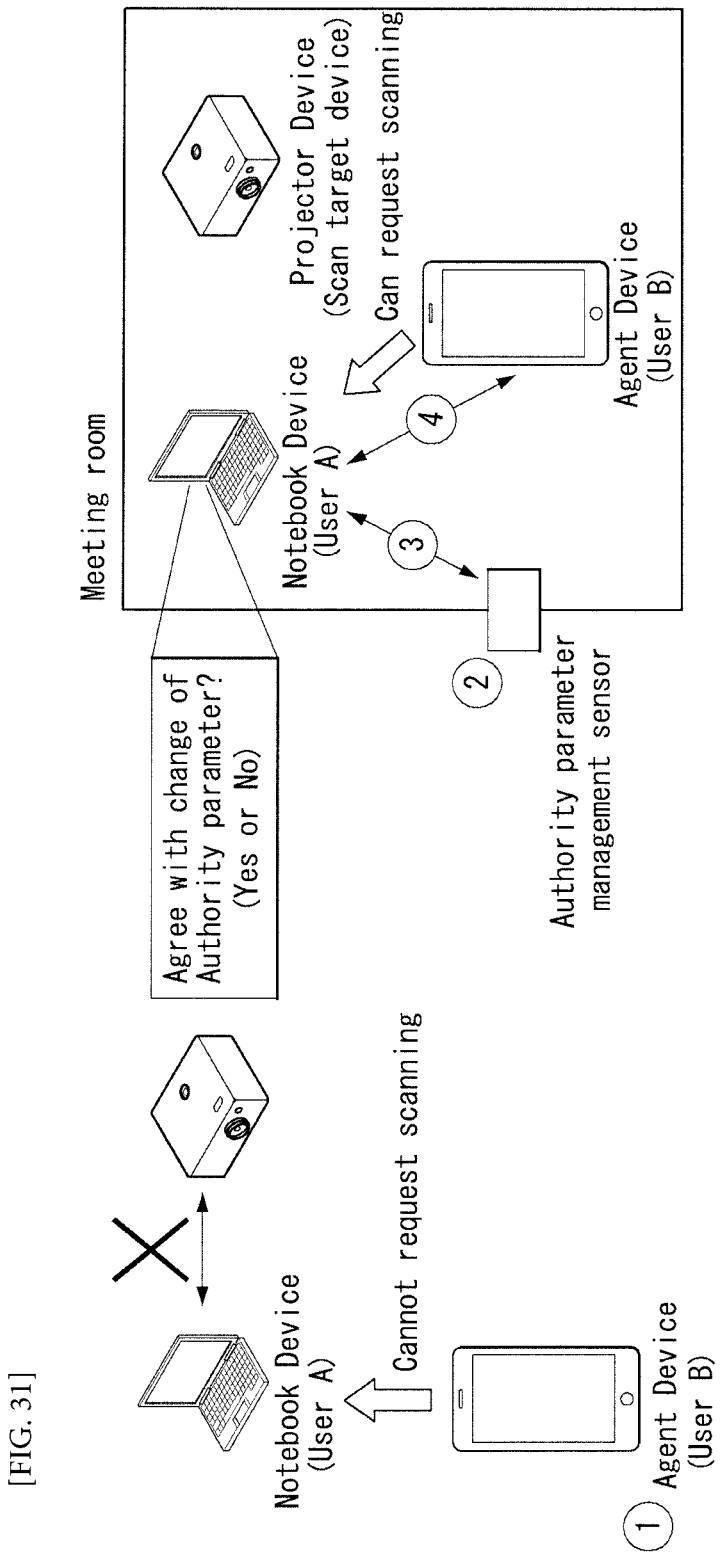
[FIG. 31]

[FIG. 32]
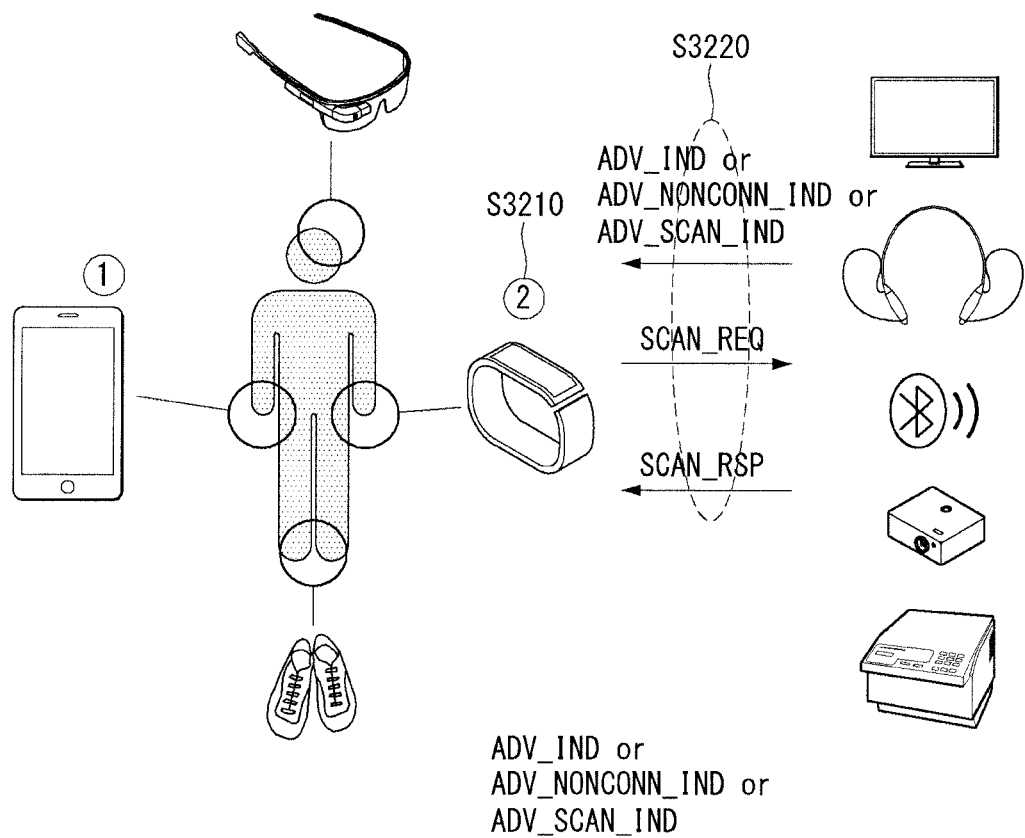

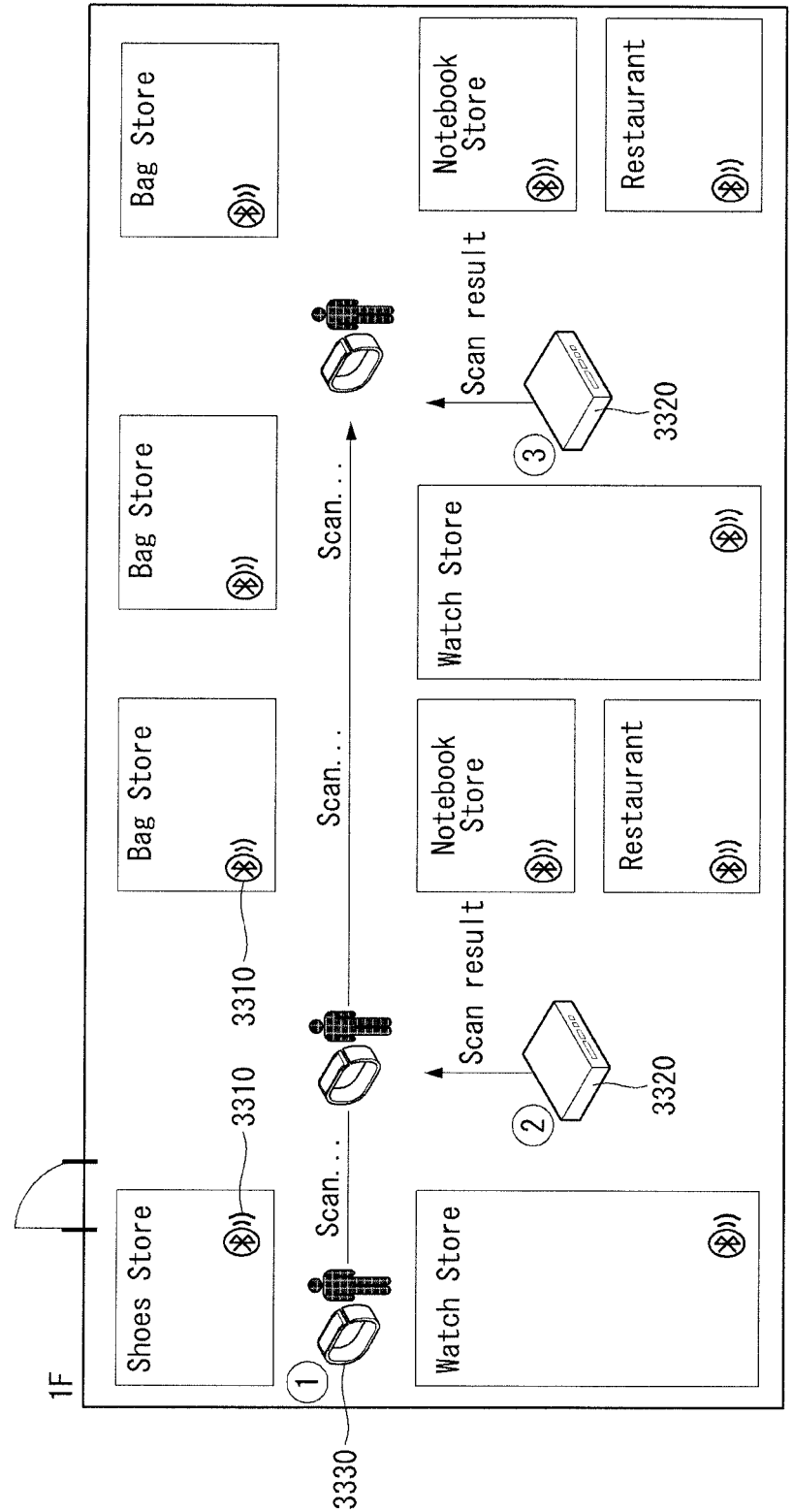
[FIG. 33]

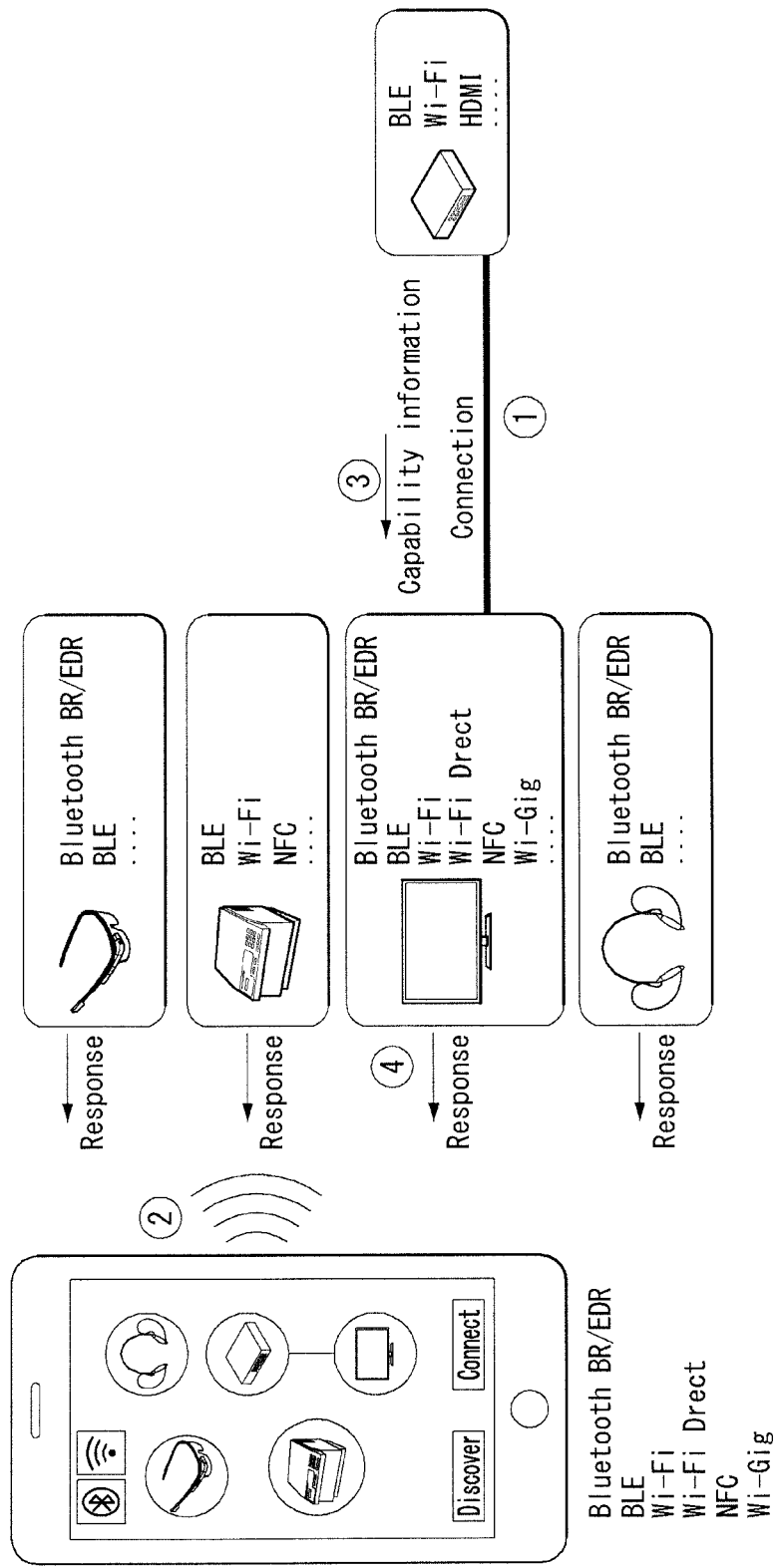
[FIG. 34]

METHOD FOR PERFORMING SCANNING IN WIRELESS COMMUNICATION SYSTEM, AND APPARATUS THEREFOR

CROSS REFERENCE TO RELATED APPLICATIONS

This application is the National Phase of PCT International Application No. PCT/KR2016/003837, filed on Apr. 12, 2016, which claims priority under 35 U.S.C. 119(e) to U.S. Provisional Application No. 62/146,931, filed on Apr. 13, 2015, all of which are hereby expressly incorporated by reference into the present application.

TECHNICAL FIELD

This specification relates to a wireless communication system and, more particularly, to a method of performing Bluetooth on a surrounding device using Bluetooth.

BACKGROUND ART

Bluetooth is one of typical short range wireless technologies for exchanging information among various devices such as smart phones, PCs, earphones, and headphones.

Bluetooth technology is now adopted by most of smart phones, PCs, and notebooks; and is widely used for the convenience of use. The easy pairing process of Bluetooth technology provides reliable connectivity among different devices. LE, that is, a recent Bluetooth variant, is capable of providing information of hundreds of kilobytes reliably while requiring considerably reduced power consumption.

The Bluetooth core specification includes basic rate/enhanced data rate (BR/EDR) and low energy (LE) version.

Of the two versions, Bluetooth low energy (hereinafter, it is called 'BLE') is a subset of Bluetooth Specification v4.0, aimed for high energy efficiency compared with the former Bluetooth specifications.

With the advent of the Internet of Things (IoT) era, the number of devices carried by a user and the number of devices around the user are greatly increased.

BLE has been designed for the purpose of high energy efficiency in performing various wireless communication functions, but requires slight high power in performing a function, such as scanning for continuously searching for a surrounding device.

A procedure of searching for a surrounding device, that is, a scanning procedure, is an essential procedure in a wireless communication procedure. Accordingly, if available energy resources of a device are small, a phenomenon in which smooth wireless communication is not performed because scanning is not performed may occur.

Such a phenomenon becomes severe when surrounding retrieved devices are many, and may act as a fatal problem in performing wireless communication.

Furthermore, when a network is configured using a plurality of BLE devices, if scanning is performed on only a specific device, the entire network may be broken due to the exhaustion of energy of one device.

Furthermore, when a user performs search, he or she requests information from surrounding devices and obtains the information therefrom. In this case, if the surrounding devices are connected, it may be inefficient for each device to provide its own information to each user.

DISCLOSURE

Technical Problem

Accordingly, in order to solve the aforementioned problems, an object of this specification is to provide a method of enabling another BLE device to perform search for surrounding devices using Bluetooth LE.

Furthermore, an object of this specification is to provide a method of requesting search from another device and of another device obtaining the results of search stored in its database.

Furthermore, an object of this specification is to provide a method of selecting a scan role device that will perform scan through a dynamic scan role assignment (DSRA) algorithm.

Furthermore, an object of this specification is to provide a method of newly defining a mode of a device for selecting a scan role device, a procedure to be performed by a device, and messages and parameters to be exchanged between devices.

Technical objects to be achieved by the present invention are not limited to the aforementioned objects, and those skilled in the art to which the present invention pertains may evidently understand other technological objects from the following description.

Technical Solution

In this specification, a method of performing scanning in a wireless communication system is performed by a first device, and includes the steps of receiving a scan request for at least one neighbouring device and performing a scan negotiation procedure with a second device. The scan negotiation procedure includes the steps of exchanging scan role assignment related parameters related to a determination of a device to perform a scan role with the second device; determining a device to perform the scan role based on the exchanged scan role assignment related parameters; and obtaining capability information about the at least one neighbouring device.

Furthermore, in this specification, the step of exchanging the scan role assignment-related parameters with the second device includes the steps of exchanging candidate parameters related to the scanning with the second device and exchanging available parameters available for the scanning among the exchanged candidate parameters with the second device.

Furthermore, in this specification, the scan role is determined based on a dynamic scan role assignment (DSRA) algorithm. The scan role assignment algorithm includes the steps of selecting a specific parameter of the exchanged available parameters; calculating a scan role assignment value by multiplying the selected specific parameter by a scale factor; and determining the device to perform the scan role by comparing the calculated scan role assignment values.

Furthermore, in this specification, the candidate parameters are divided into a general candidate parameter and a functional candidate parameter. The general candidate parameter is related to an environment value of the device, and the functional candidate parameter is related to at least one of a user condition and user setting.

Furthermore, in this specification, the general candidate parameter is information related to the amount of remaining battery power of the device, a supplied power method, allocated computing resources, the number of currently connected devices, a role value related to the role of the device or a manufacturer.

Furthermore, this specification further includes the step of performing a scan role authority procedure with the second device in order to determine whether or not to perform the scan negotiation procedure.

Furthermore, in this specification, the scan role authority procedure includes the step of exchanging authority parameters related to a scan role authority with the second device.

Furthermore, in this specification, the scan negotiation procedure further includes the step of transmitting a scan role request message to the second device. The scan role authority procedure is performed after transmitting the scan role request message.

Furthermore, in this specification, the authority parameter is set as a first parameter related to the registration of a user device, a second parameter related to a scan request level, a third parameter related to the product group of the device or a fourth parameter related to security.

Furthermore, in this specification, the scan negotiation procedure is performed when the second parameter of the first device is lower than the second parameter of the second device and the third parameter of the first device is different from the third parameter of the second device.

Furthermore, in this specification, the scan negotiation procedure is performed when a mode of the second device is set as a scan acceptable mode.

Furthermore, in this specification, the scan role includes a direct scan role and an indirect scan role. The direct scan role obtains the capability information about the surrounding device by scanning an RF channel in a non-connection state with the surrounding device. The indirect scan role obtains the capability information about the surrounding device using a data channel in a connection state with the surrounding device.

Furthermore, this specification further includes the step of transmitting a scan negotiation confirm message for checking the device to perform the scan role to the second device.

Furthermore, in this specification, a first device for performing scanning in a wireless communication system includes a communication unit for communicating with an outside in a wired or wireless manner and a processor functionally connected to the communication unit. The processor receives a scan request for at least one neighbouring device and performs a scan negotiation procedure with a second device. Performing, by the processor, control so that the scan negotiation procedure is performed includes performing the control so that scan role assignment-related parameters related to a determination of a device to perform a scan role are exchanged with the second device, a device to perform the scan role is determined based on the exchanged scan role assignment-related parameters, and capability information about the at least one neighbouring device is obtained.

Advantageous Effects

This specification has an effect in that even a device having insufficient energy resources can perform a scanning function using low power compared to an existing wireless communication technology because it performs a search function through another device.

Furthermore, this specification has an effect in that it can prevent a phenomenon in which specific nodes continue to perform a scanning function and thus energy resources are suddenly exhausted from a viewpoint that a sensor network is constructed.

That is, this specification can extend the time during which the entire sensor network is maintained because energy efficient load balancing is performed between devices.

Furthermore, this specification has an effect in that it can obtain information of devices connected to a representative device of connected devices and provide the information to a user.

Effects which may be obtained by the present invention are not limited to the aforementioned effects, and various other effects may be evidently understood by those skilled in the art to which the present invention pertains from the following description.

DESCRIPTION OF DRAWINGS

The accompanying drawings, which are included to provide a further understanding of the invention and are incorporated in and constitute part of this specification, illustrate embodiments of the invention and together with the description serve to explain the principles of the invention. In the drawings:

FIG. 1 illustrates one example of a wireless communication system using a Bluetooth low energy technology according to the present invention.

FIG. 2 illustrates one example of the internal block diagram of a server device and a client device capable of implementing methods of the present invention.

FIG. 3 illustrates one example of a Bluetooth low energy network topology.

FIGS. 4 and 5 illustrate one example of Bluetooth communication architecture to which methods according to the present invention may be applied.

FIG. 6 illustrates one example of the GATT Profile structure of Bluetooth low energy.

FIG. 7 illustrates one example of a method for a connection procedure of the Bluetooth low energy technology.

FIG. 8 is a flowchart illustrating one example of a method for providing an object transfer service in the Bluetooth low energy technology.

FIG. 9 is a flowchart illustrating one example of a method for connection procedure in the Bluetooth BR/EDR technology.

FIG. 10 is a schematic diagram showing an example of a Bluetooth mesh network to which the present invention may be applied.

FIG. 11 is a diagram showing an example of the protocol stack of the Bluetooth mesh network to which the present invention may be applied.

FIG. 12 is a flowchart showing an example of a method for joining, by a device to which the present invention may be applied, a Bluetooth mesh network.

FIG. 13 is a diagram showing an example of a method of performing a scanning procedure on a surrounding device.

FIG. 14 is a block diagram of each device for searching for a surrounding device and a conceptual diagram showing an example in which messages are transmitted/received between devices, which are proposed by this specification.

FIG. 15 is a block diagram of each device for searching for a surrounding device and a conceptual diagram showing another example in which messages are transmitted/received between devices, which are proposed by this specification.

FIG. 16 is a diagram showing an example of a method of performing search for a surrounding device using the scan function of another device and obtaining capability information of the retrieved surrounding device, which is proposed by this specification.

FIG. 17 is a diagram showing another example of a method of performing search for a surrounding device using the scan function of another device and obtaining capability information of the retrieved surrounding device in BLE communication, which is proposed by this specification.

FIG. 18 is a diagram showing an example of the type of scan role proposed by this specification.

FIG. 19 is a diagram showing yet another example of a method of searching for a surrounding device using the scan function of another device and obtaining information of the surrounding device, which is proposed by this specification.

FIGS. 20 and 21 are flowcharts showing examples of a scan negotiation procedure proposed by this specification.

FIG. 22 a diagram showing another example of a scan negotiation procedure proposed by this specification.

FIG. 23 is a diagram showing yet another example of a scan negotiation procedure proposed by this specification.

FIG. 24 is a diagram showing yet another example of a scan negotiation procedure proposed by this specification.

FIG. 25 is a diagram showing an example of a method of performing a DSRA algorithm proposed by this specification.

FIG. 26 is an example of a concept for illustrating a functional candidate parameter proposed by this specification.

FIG. 27a is a diagram showing an example of a bitmask message format proposed by this specification.

FIG. 27b is a diagram showing an example of a method of transmitting and receiving the bitmask message of FIG. 27a between devices.

FIG. 28 is a flowchart showing an example of a method of performing a scan role authority procedure proposed by this specification.

FIG. 29 is a flowchart showing an example of a scan role assignment procedure proposed by this specification.

FIG. 30 is a diagram showing whether a scanning request is possible according to an authority parameter, which is proposed by this specification.

FIG. 31 is a conceptual diagram showing an example of an operation of changing an authority parameter, which is proposed by this specification.

FIG. 32 is a diagram showing an example of the scanning procedure of a surrounding device, which is proposed by this specification.

FIG. 33 is a diagram showing another example of the scanning procedure of a surrounding device, which is proposed by this specification.

FIG. 34 is a diagram showing another example of the scanning procedure of a surrounding device, which is proposed by this specification.

MODE FOR INVENTION

In what follows, the present invention will be described in more detail with reference to appended drawings.

A suffix such as "module" and "unit" introduced in the description below is assigned merely to facilitate description of this document, and the "module" and "unit" may be used interchangeably.

Meanwhile, a device according to this document refers to a device capable of wireless communication, including a mobile phone including a smartphone, tablet PC, desktop computer, notebook, and television including a smart TV and IPTV.

Furthermore, embodiments of the present invention will be described in detail with reference to appended drawings and descriptions contained in the drawings, but the technical scope of the present invention is not restricted by the embodiments or limited to the embodiments.

Wherever possible, general terms widely used by the public have been chosen as long as the terms do not obscure their technical functions intended in the present invention; however, those terms may be changed by the intention of those skilled in the art, practices, or advent of a new technology.

In some case, specific terms are chosen arbitrarily; in that case, specific meaning of the corresponding terms will be elaborated at the corresponding description.

Therefore, the terms used in this document should be interpreted on the basis of their actual meaning and the description throughout the document rather than the immediate names of the terms.

FIG. 1 illustrates one example of a wireless communication system which makes use of a Bluetooth low energy technology according to the present invention.

The wireless communication system 100 includes at least one server device 110 and at least one client device 120.

The server device and the client device perform Bluetooth communication by using Bluetooth low energy (hereinafter called BLE for the purpose of convenience) technology.

First of all, compared with Bluetooth BR/EDR (Basic Rate/Enhanced Data Rate) technology, BLE technology requires a relatively small duty cycle. Products based on BLE technology may be manufactured at low costs and require considerably small power consumption through low speed data transmission rate; therefore, they may be operated more than one year with a coin cell battery.

Furthermore, BLE technology simplifies a connection procedure between devices and requires a smaller packet size than Bluetooth BR/EDR technology.

Features of BLE technology may be summarized as follows: (1) the number of RF channels is 40, (2) the data transmission speed of 1 Mbps is supported, (3) star topology is used, (4) latency is 3 ms, (5) the maximum current is less than 15 mA, (6) the output power is less than 10 mW (10 dBm), and (7) main application fields include mobile phones, watch, sports, health-care, sensor, and device control.

The server device 110 may operate as a client device in a relationship with a different device, and similarly the client device may operate as a server device in a relationship with a different device. In other words, in the BLE communication system, a device may operate as a server device or a client device, and if needed, a device may operate as a server device and a client device at the same time.

The server device 110 may be called a data service device, master device, master, server, conductor, host device, audio source device, or first device. The client device may be called a slave device, slave, client, member, sink device, audio sink device, or second device.

The server device and the client device constitute a main part of the wireless communication system, and the wireless communication system may include other constituting elements in addition to the server device and the client device.

The server device refers to a device which receives data from a client, performs communication directly with the client device, and if receiving a data request from the client device, provides data to the client device through a response.

Furthermore, the server device sends a notification message and indication message to the client device to provide data information to the client device. Furthermore, when transmitting an indication message to the client device, the server device receives a confirm message corresponding to the indication message from the client device.

Furthermore, the server device may provide data information to the user through a display unit or receive a request input from the user through a user input interface while transmitting and receiving a notification, indication, and confirm message to and from the client device.

Furthermore, the server device may read data from a memory unit or write new data to the corresponding memory while transmitting and receiving a message to and from the client device.

Furthermore, one server device may be connected to a plurality of client devices and may be easily re-connected to client devices by using bonding information.

The client device 120 refers to a device which requests data information and data transmission from a server device.

The client device receives data from the server device through a notification message and indication message and when receiving an indication message from the server device, sends a confirm message in response to the indication message.

In the same way as the server device, the client device may provide information to the user through a display unit or receive an input from the user through a user input interface while transmitting and receiving message to and from the server device.

Furthermore, the client device may read data from a memory unit or write new data to the corresponding memory while transmitting and receiving a message to and from the server device.

Hardware components such as a display unit, user input interface, and memory unit of the server device and the client device will be described in detail with reference to FIG. 2.

Furthermore, the wireless communication system may form a Personal Area Network (PAN) by using Bluetooth technology. As one example, the wireless communication system may exchange files and documents in a prompt and safe manner by forming a private piconet among devices.

A BLE device may operate to support various Bluetooth-related protocols, profiles, and processes.

FIG. 2 illustrates one example of an internal block diagram of a server device and a client device capable of implementing methods of the present invention.

A server device may be connected to at least one client device.

Furthermore, depending on the needs, the internal block diagram of each device may further include other constituting elements (modules, blocks, or units), and part of the constituting elements of FIG. 2 may be omitted.

As shown in FIG. 2, a server device includes a display unit 111, a user input interface 112, a power supply unit 113, a processor (or controller) 114, a memory unit 115, a Bluetooth interface 116, other interface 117, and a communication unit (or transceiver unit) 118.

The display unit 111, user input interface 112, power supply unit 113, processor 114, memory unit 115, Bluetooth interface 116, other interface 117, and communication unit 118 are functionally connected to perform a method of the present invention.

Furthermore, a client device includes a display unit 121, a user input interface 122, a power supply unit 123, a processor 124, a memory unit 125, a Bluetooth interface 126, and a communication unit (or transceiver unit) 127.

The display unit 121, user input interface 122, power supply unit 123, processor 124, memory unit 125, Bluetooth interface 126, and communication unit 127 are functionally connected to each other to perform a method of the present invention.

The Bluetooth interface 116, 126 refers to a unit (or module) capable of transmitting a request/response, command, notification, indication/confirm message, or data between devices by using Bluetooth technology.

The memory 115, 125 is a unit implemented in various types of devices and refers to a unit to which various types of data are stored.

The processor 114, 124 refers to a module controlling the overall operation of the server device or the client device; and controls the server device or the client device to request transmission of a message through the Bluetooth interface or other interface and to process a received message.

The processor 114, 124 may be represented by a controller or a control unit.

The processor 114, 124 may include Application-Specific Integrated Circuit (ASIC), other chipsets, logical circuit and/or data processing device.

The memory 115, 125 may include ROM (Read-Only Memory), RAM (Random Access Memory), flash memory, memory card, storage medium and/or other storage device.

The communication unit 118, 127 may include baseband circuit for processing a radio signal. In case an embodiment is implemented in the form of software, the method described above may be implemented by a module (process or function) which performs the function described above. A module is stored in the memory and is carried out by the processor.

The memory 115, 125 may be installed inside or outside the processor 114, 124 and may be connected to the processor 114, 124 through various well-known means.

The display unit 111, 121 refers to the module for providing status information of a device and message exchange information to the user through a display.

The power supply unit 113, 123 refers to the module receiving external or internal power under the control of the controller and supplying power required for the operation of each individual element.

As described above, BLE technology is characterized by a small duty cycle and considerably reduces power consumption through a low data transmission rate; therefore, BLE technology is capable of supplying power required for the operation of each individual element even with small output power (which is less than 10 mW (10 dBm)).

The user input interface 112, 122 refers to the module which provides a user input such as a display button to the controller so that the user may control the operation of a device.

FIG. 3 illustrates one example of a Bluetooth low energy network topology.

With reference to FIG. 3, a device A corresponds to a piconet (piconet A, the shaded area) master having a device B and a device C as slaves.

At this time, a piconet refers to a set of devices where one from among a plurality of devices acts as a master and the others occupy a shared physical channel connected to the master device.

A BLE slave does not share the common physical channel with the master. Each slave communicates with the master through a separate physical channel. There is another piconet (piconet F) which consists of a master device F and a slave device G.

A device K belongs to a scatternet K. At this time, a scatternet refers to a group of piconets interconnected to each other.

A device K is a master of a device L and at the same time, a slave of a device M.

A device O also belongs to a scatternet O. The device O is a slave of a device P and at the same time, a slave of a device Q.

FIG. 3 illustrates a case where five different device groups are formed.

A device D is an advertiser, and a device A is an initiator (group D).

A device E is a scanner, and a device C is an advertiser (group C).

A device H is an advertiser, and a device I and a device J are scanners (group H).

The device K is also an advertiser, and a device N is an initiator (group K).

A device R is an advertiser, and the device O is an initiator (group R).

The device A and the device B use one BLE piconet physical channel.

The device A and the device C use another BLE piconet physical channel.

In group D, the device D advertises by using an advertisement event which may be connected on an advertising physical channel, and the device A is an initiator. The device A may establish a connection to the device D and add a device to the piconet A.

In group C, the device C advertises on an advertising physical channel by using a certain type of an advertisement event captured by the scanner device E.

The group D and the group C may utilize different advertising physical channels or different time frames to avoid collision.

The piconet F has one physical channel. The device F and the device G use one BLE piconet physical channel. The device F is a master, and the device G is a slave.

The group H has one physical channel. The device H, I, and J use one BLE advertising physical channel. The device H is an advertiser, and the device I and J are scanners.

In the scatternet K, the device K and L use one BLE piconet physical channel. The device K and M use another BLE piconet physical channel.

In group K, the device K advertises by using an advertisement event which may be connected to an advertising physical channel, and the device N is an initiator. The device N may establish a connection with the device K. At this time, the device K acts as a slave of two devices, and at the same time, a master of one device.

In the scatternet O, the device O and P use one BLE piconet physical channel. The device O and Q use another BLE piconet physical channel.

In group R, the device R advertises by using an advertisement event which may be connected to an advertising physical channel, and the device O is an initiator. The device O may establish a connection with the device R. At this time, the device O acts as a slave of two devices, and at the same time, a master of one device.

FIGS. 4 and 5 illustrate one example of Bluetooth communication architecture to which methods according to the present invention may be applied.

More specifically, FIG. 4 illustrates one example of Bluetooth BR (Basic Rate)/EDR (Enhanced Data Rate), and FIG. 5 illustrates one example of Bluetooth low energy (LE) architecture.

First, as shown in FIG. 4, the Bluetooth BR/EDR architecture includes a controller stack 410, a host controller interface (HCI) 420 and a host stack 430.

The controller stack (or controller module) 410 refers to the hardware for transmitting or receiving Bluetooth packets to and from a wireless transmission and reception module dealing with Bluetooth signals of 2.4 GHz; and includes a BR/EDR Radio layer 411, a BR/EDR Baseband layer 412, and a BR/EDR Link Manager layer 413.

The BR/EDR Radio layer 411 transmits and receives a radio signal of 2.4 GHz and is capable of transmitting data by hopping 79 RF channels when Gaussian frequency shift keying (GFSK) modulation is employed.

The BR/EDR baseband layer 412 transmits a digital signal, selects a channel sequence which performs hopping 1600 times per second, and transmits a time slot spanning 625 us for each channel.

The link manager layer 413 controls the overall operation of a Bluetooth connection such as link setup, control, and security by using a link manager protocol (LMP).

The link manager layer may perform the following functions.

Control of ACL/SCO logical transport and logical link setup

Detach: removes a connection and informs the corresponding device of the cause of the removal.

Performs power control and role switch

Performs a security function such as authentication, pairing, and encryption.

The host controller interface layer 420 provides an interface between a host module 430 and a controller module 410 so that a host may provide a command and data to a controller and the controller may provide an event and data to the host.

The host stack (or host module) 430 includes L2CAP 437, Service Discovery Protocol (SDP) 433, BR/EDR protocol 432, BR/EDR profiles 431, Attribute Protocol 436, Generic Access Profile (GAP) 434, and Generic Attribute Profile (GATT) 435.

The Logical Link Control and Adaptation Protocol (L2CAP) 437 provides one bilateral channel for transmitting data according to a specific protocol or with a specific profile.

The L2CAP multiplexes various protocols and profiles provided by Bluetooth upper layers.

The L2CAP of the Bluetooth BR/EDR specification uses a dynamic channel; supports a protocol service multiplexer, retransmission, and streaming mode; and provides segmentation and reassembly, per-channel flow control, and error control.

The service discovery protocol (SDP) 433 refers to the protocol used to search for a service (profile and protocol) that a Bluetooth service supports.

The BR/EDR protocols and profiles 432, 431 define a service employing the Bluetooth BR/EDR specification and an application protocol according to which exchange of data is performed.

The Attribute Protocol 436 relies on a server-client structure, which defines rules for the corresponding device to access data. Six message types are defined as shown below: Request message, Response message, Command message, Notification message, and Indication message.

Request message from client to server with Response message from server to client Command message from client to server without Response message Notification message from server to client without Confirm message Indication message from server to client with Confirm message from client to server The Generic Attribute Profile (GATT) 435 defines an attribute type.

The Generic Access Profile (GAP), 434 defines a method for discovering and connecting a device; and a method for providing information to a user. The GAP provides a privacy scheme.

As shown in FIG. 5, the BLE structure includes a controller stack capable of processing a wireless device interface for which timing is critical and a host stack capable of processing high level data.

The controller stack may be called a controller, but in order to avoid being confused with the processor which is an internal element of a device described earlier in FIG. 2, the name of the controller stack is preferred in what follows.

First, the controller stack may be implemented by using a communication module which may include a Bluetooth wireless device and a processor module which may include a processing device such as a microprocessor.

The host stack may be implemented as part of the OS operating on the processor module or as a package instance on the OS.

In some cases, the controller stack and the host stack may be operated or carried out on the same processing device within the processor module.

The host stack includes Generic Access Profile (GAP) 510, GATT based Profiles 520, Generic Attribute Profile (GATT) 530, Attribute Protocol (ATT) 540, Security Manager (SM) 550, and Logical Link Control and Adaptation Protocol (L2CAP) 560. The host stack is not limited to the aforementioned composition, but may include various protocols and profiles.

By using the L2CAP, the host stack multiplexes various protocols and profiles that Bluetooth specification provides.

First, the L2CAP 560 provides one bilateral channel for transmitting data to according to a specific protocol or with a specific profile.

The L2CAP is capable of multiplexing data among upper layer protocols, segmenting or reassembling packages, and managing multicast data transmission.

BLE uses three fixed channels: one for signaling, another for the security manager, and the third for the attribute protocol.

On the other hand, BR/EDR (Basic Rate/Enhanced Data Rate) uses a dynamic channel and supports protocol service multiplexer, retransmission, streaming mode.

The Security Manager (SM) 550 authenticates a device, which is a protocol for providing key distribution.

The Attribute Protocol (ATT) 540 relies on a server-client structure, which defines rules for the corresponding device to access data. Six message types are defined: Request, Response, Command, Notification, Indication, and Confirmation.

① Request and Response message: Request message is used when a client device requests specific information from a server device, and Response message is used in response to the Request message, which is transmitted from the server device to the client device.

② Command message: It is transmitted from the client device to the server device to indicate a command for specific operation, but the server device does not transmit a response to the Command message to the client device.

③ Notification message: The server device transmits this message to the client device to notify of an event, but the client device does not transmit a confirmation message with respect to the Notification message to the server.

④ Indication and Confirm message: the server device transmits this message to the client device to notify of an event. Different from the Notification message, the client device transmits a Confirm message with respect to the Indication message to the server device.

The Generic Access Profile (GAP) is the layer newly implemented to support BLE technology and is used to control selection of roles for communication among BLE devices and the procedure of multi-profile operation.

Furthermore, the GAP is used mainly for device discovery, connection establishment, and security; defines a method for providing information to a user; and defines the following attribute types.

① Service: a combination of behaviors related to data. Defines basic operation of a device.

② Include: defines a relationship between services.

③ Characteristics: a data value used by a service

④ Behavior: a format that may be readable by a computer, which is defined by Universal Unique Identifier (UUID) and a value type.

GATT-based profiles are dependent on the GATT and are applied mainly for BLE devices. The GATT-based profiles may include Battery, Time, FindMe, Proximity, Object Delivery Service, and so on. More specific descriptions of the GATT-based profiles are as follows.

Battery: method for exchanging battery information.

Time: method for exchanging time information.

FindMe: provides an alarm service according to a distance.

Proximity: method for exchanging battery information.

Time: method for exchanging time information.

The GATT may be used as a protocol by which to describe how ATT is utilized at the time of composing services. For example, the GATT may be used to define how ATT profiles are grouped together with services and to describe characteristics associated with the services.

Therefore, GATT and ATT describe device states and services; and how features are associated with each other and how they are used.

The controller stack includes a physical layer 590, link layer 580, and host controller interface 570.

The physical layer (wireless transmission and reception module 590) transmits and receives a radio signal of 2.4 GHz; and uses Gaussian Frequency Shift Keying (GFSK) modulation and frequency hopping utilizing 40 RF channels.

The link layer 580 transmits or receives Bluetooth packets.

Furthermore, the link layer establishes a connection between devices after performing the advertising and scanning function by using three advertising channels; and provides a function of exchanging a maximum of 42 bytes of data packets through 37 data channels.

The Host Controller Interface (HCI) provides an interface between the host stack and the controller stack so that the host stack may provides commands and data to the controller stack and the controller stack may provide events and data to the host stack.

In what follows, the procedure of Bluetooth low energy (BLE) will be described briefly.

The BLE procedure includes a device filtering procedure, advertising procedure, scanning procedure, discovering procedure, and connecting procedure.

Device Filtering Procedure

The device filtering procedure is intended to reduce the number of devices performing a response to a request, command, or notification in the controller stack.

It is not necessarily required for all of the devices to respond to a received request; therefore, the controller stack reduces the number of transmitted requests so that power consumption may be reduced in the BLE controller stack.

An advertising device or a scanning device may perform the device filtering procedure to restrict devices which receive advertisement packets, scan request, or connection request.

At this time, an advertising device refers to a device which transmits an advertisement event, namely a device which performs advertisement and is also called an advertiser.

A scanning device refers to a device which performs scanning, namely a device which transmits a scan request.

In the BLE specification, if a scanning device receives part of advertisement packets from an advertising device, the scanning device has to transmit a scan request to the advertising device.

However, in case transmission of a scan request is not required as the device filtering procedure is employed, the scanning device may ignore advertisement packets transmitted from an advertising device.

The device filtering procedure may be used even in the connection request procedure. If device filtering is used for the connection request procedure, the need for transmitting a response to a connection request may be made unnecessary by ignoring the connection request.

Advertising Procedure

An advertising device performs an advertisement procedure to perform non-directional broadcast by using the devices within the range of the advertising device.

At this time, non-directional broadcast refers to the broadcast in all directions rather than the broadcast in specific directions.

Different from the non-directional broadcast, directional broadcast refers to the broadcast in a specific direction. Non-directional broadcast is performed without involving a connection procedure between devices in a listening state (hereinafter, they are called listening devices).

The advertising procedure is used to establish a Bluetooth connection to a nearby initiating device.

Or the advertising procedure may be used to provide periodic broadcast of user data to the scanning devices performing listening through an advertising channel.

In the advertising procedure, all of the advertisement (or advertisement events) are broadcast through an advertising physical channel.

Advertising devices may receive scan requests from listening devices performing the listening operation to obtain additional user data from advertising devices. An advertising device transmits a response with respect to the scan request to the device which has transmitted the scan request through the same advertising physical channel through which the advertising device has received the scan request.

While the broadcast user data sent as part of advertising packets form dynamic data, the scan response data are static for the most part.

An advertising device may receive a connection request from an initiating device on the advertising (broadcast) physical channel. If the advertising device has used a connectable advertisement event and the initiating device has not been filtered by the filtering procedure, the advertising device stops advertisement and enters a connected mode. The advertising device may resume advertisement after entering the connected mode.

Scanning Procedure

A device performing scan operation, namely a scanning device performs a scanning procedure to listen to non-directional broadcast of user data from advertising devices which use an advertising physical channel.

To request additional user data, the scanning device transmits a scan request to an advertising device through the advertising physical channel. The advertising device transmits a scan response with respect to the scan request through the advertising physical channel by including additional user data that the scanning device has requested.

The scanning procedure may be used while the scanning device is being connected to another BLE device in a BLE piconet.

If the scanning device receives a broadcast advertising event and stays in an initiator mode where a connection request may be initiated, the scanning device may initiate a Bluetooth connection to an advertising device by sending a connection request to the advertising device through the advertising physical channel.

If the scanning device transmits a connection request to the advertising device, the scanning device stops all the scanning for additional broadcast and enters the connected mode.

Discovering Procedure

Devices capable of Bluetooth communication (hereinafter, they are called 'Bluetooth devices') perform the advertising procedure and the scanning procedure to discover devices in the surroundings of the devices or to be discovered by other devices within a given area.

The discovering procedure is performed in an asymmetric manner. A Bluetooth device searching for another Bluetooth device in the surroundings is called a discovering device and performs listening to search for devices advertising an advertisement event that may be scanned. A Bluetooth device that may be found and used by another device is called a discoverable device, and the discoverable device actively broadcasts an advertisement event so that other devices may scan the discoverable device through an advertising (broadcast) physical channel.

Both of the discovering device and the discoverable device may be already connected to other Bluetooth devices in a piconet.

Connecting Procedure

The connecting procedure is asymmetric. In the connecting procedure, while a particular Bluetooth device is performing the advertising procedure, other Bluetooth devices are required to perform the scanning procedure.

In other words, the advertising procedure may be a primary task to be performed, and as a result, only one device will respond to the advertisement. After receiving a connectable advertisement event from an advertising device, the connecting procedure may be initiated by sending a connection request to the advertising device through the advertising (broadcast) physical channel.

Next, operation states defined in the BLE technology, namely advertising state, scanning state, initiating state, and connection state will be described briefly.

Advertising State

The link layer (LL) enters the advertising state by the command of the host (stack). In case the link layer is in the advertising state, the link layer transmits advertising Packet Data Units (PDUs) from advertisement events.

Each advertisement event includes at least one advertising PDU, and advertising PDUs are transmitted through advertising channel indices used. Each advertisement event may be closed earlier in case advertising PDUs are transmitted through the respective advertising channel indices, the advertising PDUs are terminated, or the advertising device needs to secure space to perform other functions.

Scanning State

The link layer enters the scanning state by the command of the host (stack). In the scanning state, the link layer listens to advertising channel indices.

The scanning state supports two types: passive and active scanning. The host determines scanning type.

No separate time or advertising channel index is defined to perform scanning.

While in the scanning state, the link layer listens to the advertising channel index for the duration of scanWindow. A scanInterval is defined as an interval between start points of two consecutive scan windows.

When there is no scheduling collision, the link layer has to perform listening to complete all of the scanIntervals of scanWindows as commanded by the host. In each scanWindow, the link layer has to scan other advertising channel indices. The link layer uses all of the advertising channel indices available.

In the case of passive scanning, the link layer is unable to transmit any packet but only receives packets.

In the case of active scanning, the link layer performs listening to the advertising device to rely on the advertising PDU type by which additional information related to the advertising PDUs and advertising device may be requested.

Initiating State

The link layer enters the initiating state by the command of the host (stack).

While in the initiating state, the link layer performs listening to the advertising channel indices.

While in the initiating state, the link layer listens to the advertising channel index for the duration of scanWindow.

Connection State

The link layer enters the connection state when a device performing a connection request, namely the initiating device transmits the CONNECT_REQ PDU to an advertising device or the advertising device receives the CONNECT_REQ PDU from the initiating device.

Establishing a connection is taken into account after the link layer enters the connection state. However, there is no need to take into account establishing a connection at the time the link layer enters the connection state. The only difference between a newly created connection and a pre-existing connection is a supervision timeout value for link layer connection.

When two devices are connected to each other, the two devices perform the respective roles different from each other.

The link layer performing the role of the master is called a master, while the link layer performing the role of the slave is called a slave. The master adjusts the timing of a connection event, where the connection event denotes the time at which the mast and the slave are synchronized with each other.

A master (central) is such a device that periodically scans a connectable advertising signal to establish a connection to other device (slave, peripheral) and requests an appropriate device to establish a connection.

Furthermore, once connected to a slave device, the master device sets up timing and supervises periodic data exchange.

In this case, the timing may be a hopping rule applied to two device to exchange data each time through the same channel.

A slave (peripheral) is such a device that periodically transmits a connectable advertising signal to establish a connection with other device (master).

Therefore, if a master device which has received the connectable advertising signal sends a connection request, the slave device accepts the request and establishes a connection with the master device.

After the slave device establishes a connection with the master device, the slave device exchanges data periodically by hopping a channel according to the timing specified by the master device.

In what follows, the packet defined in the Bluetooth interface will be described briefly. BLE devices use the packets described below.

Packet Format

The link layer has only one packet format used for both of the advertising channel packet and data channel packet.

Each packet includes four fields: a preamble, access address, PDU, and CRC.

When one packet is transmitted from the advertising physical channel, the PDU will function as an advertising channel PDU; when one packet is transmitted from the data physical channel, the PDU will function as a data channel PDU.

Advertising Channel PDU

The advertising channel PDU includes a 16-bit header and a payload of various sizes.

The PDU type filed of the advertising channel included in the header supports PDU types as defined in Table 1 below.

TABLE 1

| PDU Type | PACKet Name |
| --- | --- |
| 0000 | ADV-IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called advertising PDUs and are used for specific events.

ADV_IND: connectable non-directional advertisement event

ADV_DIREC_IND: connectable directional advertisement event

ADV_NONCONN_IND: non-connectable non-directional advertisement event

ADV_SCAN_IND: non-directional advertisement event that may be scanned

The PDUs are transmitted from the link layer in the advertising state and are received by the link layer in the scanning state or initiating state.

Scanning PDUs

The advertising channel PDU type below is called a scanning PDU and is used in such a state described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDUs

The data channel PDU includes a 16 bit header and a payload of various size; and may include a Message Integrity Check (MIC) field.

The procedures, states, and packet formats of the BLE technology described above may be applied to perform the methods according to the present invention.

In what follows, the connection procedure defined in the BLE technology will be described briefly and as one example of the connection procedure, a method for providing an object transmission service according to the BLE specification will be described.

FIG. 6 illustrates one example of a GATT Profile structure of the Bluetooth low energy specification.

With reference to FIG. 6, one may see the structure for exchanging profile data defined in the Bluetooth low energy specification.

More specifically, GATT (Generic Attribute Profile) defines a method for exchanging data by using a service between Bluetooth LE devices and characteristics thereof.

In general, a peripheral device (for example, a sensor device) performs the role of a GATT server and carries the definition for the service and characteristics.

To read or write data, a GATT client sends a data request to the GATT server; the GATT client initiates all of the transactions and receives a response from the GATT server.

The GATT-based operational structure defined in the Bluetooth LE is based on profiles, services, and characteristics, which form a hierarchical structure as shown in FIG. 6.

The profile may include one or more services, and the service may include one or more characteristics or other services.

The service groups data into logical units and includes one or more characteristics or other services.

Each service has an identifier of 16 bits or 128 bits, called a Universal Unique Identifier (UUID).

The characteristic forms the lowest unit in the GATT-based operational structure. The characteristic contain only one piece of data and similarly to the service, has a UUID of 16 bits or 128 bits.

The characteristic includes descriptors for various types of information and requires one attribute to describe each individual information. The characteristic may use a couple of consecutive attributes.

The attribute includes four constituting elements as follows.

handle: address of the attribute
Type: type of the attribute
Value: value of the attribute
Permission: access right to the attribute In what follows, a connection procedure in the Bluetooth LE will be described, and as one example thereof, a method for providing an object transfer service according to the Bluetooth LE will be described.

FIG. 7 illustrates one example of a method for connection procedure of the Bluetooth low energy specification.

A server transmits an advertisement message through three advertisement channels S710.

The server may be called an advertiser before connection is established and may be called a master after connection is established. Examples of the server include sensors (for example, temperature sensors).

Furthermore, the client may be called a scanner before connection is established and may be called a slave after connection is established. An example of the client is a smartphone.

As described above, Bluetooth communication employs a total of 40 channels through the frequency of 2.4 GHz. Of the 40 channels, 3 channels are advertisement channels, used for exchanging packets to establish a connection as well as various advertising packets.

The remaining 37 channels are data channels, used for exchange of data packets after connection is established.

After receiving the advertisement message, the client may transmit a scan request to the server to obtain additional data (for example, a server device name) from the server.

Then the server transmits a scan response along with the remaining data to the client in response to the scan request.

At this time, the scan request and the scan response are one type of an advertisement packet which may include only user data of 31 bytes or less.

Therefore, in case data size is larger than 31 bytes but with large overhead from established connection to send data, the data are divided into two blocks and transmitted twice by using the scan request/scan response.

Next, the client transmits to the server a connection request for establishing a Bluetooth connection with the server S720.

Through the aforementioned step, a link layer (LL) connection is established between the server and the client.

Afterwards, the server and the client perform a security establishment procedure.

The security establishment procedure may be interpreted as secure simple pairing or may be performed with the secure simple pairing being included therein.

In other words, the security establishment procedure may be performed through a phase 1 to a phase 3.

More specifically, a pairing procedure (phase 1) is carried out between a server and a client S730.

Through the pairing procedure, the client transmits a pairing request to the server, and the server transmits a pairing response to the client.

Next, in the phase 2, legacy pairing or secure connection is carried out between the server and the client S740.

Next, in the SSP phase 3, a key distribution procedure is carried out between the server and the client S750.

Through the phases, a secure connection is established between the server and the client, and encrypted data may be transmitted and received.

FIG. 8 is a flowchart illustrating one example of a method for providing an object transfer service according to the Bluetooth low energy technology.

An object delivery service or object transfer service refers to a service supported by the BLE to transmit/receive an object such as bulk data or data in the Bluetooth communication.

To establish a Bluetooth connection between a server device and a client device, an advertisement process and a scanning process corresponding to S810 to S830 steps are carried out.

First, the server device transmits an advertisement message to the client device to inform of the information related to the server device including an object transfer service S810.

The advertisement message may be expressed as an advertisement packet data unit (PDU), advertisement packet, advertisement, advertisement frame, or advertisement physical channel PDU.

The advertisement message may include service information (including a service name) provided by the server device, name of the server device, and manufacturer data.

Furthermore, the advertisement message may be transmitted to the client device according to the broadcast or unicast scheme.

Afterwards, the client device transmits a scan request message to the server device to find out detailed information related to the server device S820.

The scan request message may be expressed as a scanning PDU, scan request PDU, scan request, scan request frame, or scan request packet.

Afterwards, the server device transmits a scan response message to the client device in response to the scan request message received from the client device S830.

The scan response message includes server device-related information requested by the client device. At this time the server device-related information may be an object or data that may be transmitted from the server device in association with provision of the object transfer service.

In case the advertisement process and the scanning process are terminated, the server device and the client device perform an initiating connection process and data exchange process corresponding to S840 to S870 steps.

More specifically, the client device transmits a connection request message to the server device to establish a Bluetooth communication connection with the server device S840.

The connection request message may be expressed as a connection request PDU, initiation PDU, connection request frame, or connection request.

Through the S840 step, a Bluetooth connection is established between the server device and the client device, after which the server device and the client device exchange data with each other. During the data exchange process, data may be transmitted and received through the data channel PDU.

The client device transmits an object data request to the server device through the data channel PDU S850. The data channel PDU may be expressed as a data request message or data request frame.

Afterwards, the server device transmits object data requested by the client device to the client device through the data channel PDU S860.

At this time, the data channel PDU is used for providing data to a corresponding device or requesting data information according to the scheme defined in the attribute protocol.

Next, in case data change occurs in the server device, the server device transmits data changed indication information to the client device through the data channel PDU to notify of change of data or object S870.

Next, the client device requests changed object information from the server device to search for changed data or changed object S880.

Next, the server device transmits changed object information to the client device in response to the request for changed object information S890.

Next, the client device searches for a changed object through a comparative analysis of the received changed object information and the object information that the client device currently has.

However, the client device performs S880 and S890 step repeatedly until a changed object or data are found.

Next, in case it is not required to maintain a connected state between the host device and the client device any more, the host device or the client device may disconnect the corresponding connected state.

FIG. 9 is a flowchart illustrating one example of a method for connection procedure according to the Bluetooth BR/EDR technology.

As shown in FIG. 9, the connection procedure defined in the Bluetooth BR/EDR consists of the following steps.

The connection procedure may be referred to as a pairing procedure.

The Bluetooth pairing procedure is described only by a standby state and a connected state.

The device which has completed Bluetooth pairing enters the connected state, and the device which has ended a connection operates in the standby state.

Furthermore, Bluetooth devices, once connected to a specific device through the connection procedure, may perform a re-connection procedure to establish re-connection afterwards.

The re-connection procedure may be performed through the same procedure as the connection procedure.

More specifically, if power is applied, a master device enters the standby state by default.

Afterwards, the master device performs an inquiry procedure S911 to discover neighboring devices for Bluetooth connection.

In other words, the master device may enter an inquiry state to discover connectable devices (slaves) in the surroundings thereof, and a slave device may enter an inquiry scan state to receive an ID packet transmitted from a neighboring device (master) in the inquiry state.

The master device in the inquiry state transmits an inquiry message by using the ID packet once or at regular intervals to discover a connectable device in the neighborhood.

The ID packet may be a general inquiry access code (GIAC) or a dedicated inquiry access code (DIAC).

After receiving GIAC or DIAC, an ID packet that the master device has transmitted, the slave device transmits a frequency hopping sequence (FHS) to perform Bluetooth pairing with the master device.

Furthermore, depending on the needs, if there are data to transmit, the slave device may transmit an extended inquiry response (hereinafter, it is called EIR) to the master device.

If a connectable Bluetooth device is found in the neighborhood through the inquiry procedure, a paging procedure S912 is carried out.

The paging procedure S912 refers to the procedure of performing actual connection by synchronizing a hopping sequence by using an address, clock information, and so on if a connectable Bluetooth device is found in the neighborhood through the inquiry procedure.

More specifically, the paging procedure may be divided into the following steps: (1) a step wherein the master device transmits a page to the slave device, (2) a step wherein the slave device transmits a slave page response to the master device, and (3) a step wherein the master device transmits a master page response to the slave device.

If the inquiry procedure and the paging procedure are completed, the master device and the slave device perform a security establishment step S914 and then L2CAP connection and service discovery step S915.

Before performing the security establishment step, the master device and the slave device exchange I/O (Input/Output) capabilities with each other S913.

The S913 step may be performed through an I/O capability request and I/O capability response.

Furthermore, the security establishment step may be interpreted as secure simple pairing or may be performed with the secure simple pairing being included therein.

The L2CAP (Logical Link Control and Adaptation Protocol) is a packet-based protocol, exhibiting characteristics similar to the UDP protocol. The L2CAP supports a packet size of 672 bytes and is capable of supporting up to 65,535 bytes once communication is initiated.

After performing the L2CAP connection and service discovery step, the master device may transmit data received from the user to the slave device S916.

If no further data exchange is performed for a predetermined time period between the master and the slave device which have performed the connection procedure as described above, the master and the slave devices enters a sleep state to prevent energy consumption, and the connected state is terminated.

Afterwards, a re-connection procedure is performed so that the master device and the slave device may transmit/receive data again.

The re-connection procedure may be performed through the same procedure as the one described earlier.

Hereinafter, a mesh network is described.

FIG. 10 is a schematic diagram showing an example of a Bluetooth mesh network to which the present invention may be applied.

As shown in FIG. 10, a mesh network refers to a network in which a plurality of devices is interconnected like a net through Bluetooth and capable of transmitting and receiving data.

In the Bluetooth mesh network technology, one or more devices that relay messages are present between a source device 200-1 that transmits data and a destination device 200-2 that receives data.

In this case, the source device and the destination device may be called edge nodes 200-1 and 200-2, and the one or more devices that relay a message maybe called relay nodes that relay a message.

Alternatively, devices whose location are easily changed, that is, the devices 200-1 and 200-2 having mobility, and fixed devices not having mobility in the state in which they have been installed disposed may be configured.

Each relay node includes the message cache of a recently received message. If the received message is already present in the message cache, the message is not relayed.

However, if the received message is not present in the message cache, the message is relayed and the message is stored in the message cache.

In general, the edge node is supplied with power through a battery and is present in a sleep state at normal times and may wake up through an interaction or periodically.

The edge node may process a received message when the following conditions are satisfied.

When a message is not present in a cache.
When a message is authenticated by a known network key.
When the destination of a message is the unicast address of the edge node or a broadcast address or group address is an address to which the edge node belongs.

In general, the relay node is a device supplied with main power, and it always wakes up and may transfer received data for other nodes.

The relay node may retransmit a received message to another node when the following conditions are satisfied.

When a message is not present in a cache.
When a message is authenticated by a known network key.
When a field (e.g., a relay number value) indicating whether a message will be relayed is a value that permits the relay.
When a destination address is a unicast address assigned to the relay node.

In a Bluetooth mesh network, a data transmission method may be divided into a flooding method and a routing method depending on the data transmission method of relay nodes 200-3 and 200-4.

The floating method refers to a method in which relay nodes that receive a message shoot the message into the air using a characteristic that radio waves are spread into the air in all direction.

That is, the floating method refers to a method in which the source device 200-1 transmits a message to the relay nodes 200-3 and 200-4 through broadcast channels and the relay nodes that have received the message transmit the message to the destination device 200-2 by transmitting the message to adjacent relay nodes.

In the flooding method, a broadcasting channel is used for the reception and retransmission of a message, and the transmission range of a message can be extended.

A mesh network of the flooding method is a dynamic network. In the mesh network of the flooding method, a device can receive a message and transmit (or retransmit) a message at any time as long as the density of the device is satisfied.

The flooding method has an advantage in that it can be easily implemented, but there may be an extensibility problem as a network extends because messages are transmitted without directivity.

That is, in the mesh network of the flooding method, when a device transmits a message, a plurality of devices receives the message and transmits the received message to a plurality of other devices.

In order to prevent such transmission, the number of devices forming a mesh network may be adjusted to be 100 to 1000, and the accurate number of devices may be determined by several elements.

For example, the number of devices may be determined by a network capacity, a traffic load of data sources, latency of a network and reliability requirements.

Furthermore, unlike in the routing method, in the flooding method, a message can be easily transferred without a cost for constructing a routing table, but there is a disadvantage in that network traffic is increased because all of the devices 200-3 and 200-4 that have received a message through relay retransmit the received message.

In the routing method, the source device 200-1 transmits a message to a specific relay node. The specific relay node that has received the message transmits the message based on information of another relay node or the destination node 200-2.

The routing method uses a broadcasting channel or point-to-point connection method for the reception and retransmission of a message.

Furthermore, in the routing method, a routing device that has received a message determines the best routing route(s) for transmitting the message to a middle device or a destination device, and determines that the message will be transmitted through which route based on a determined routing table.

The routing method has an advantage in that it has excellent extensibility, but has disadvantages in that complexity is increased and a high capacity of memory is required because each node has to transmit a message while maintaining a routing table, the routing method is less dynamic than the flooding method, and it is more difficult to implement the routing method than the flooding method.

FIG. 11 is a diagram showing an example of the protocol stack of the Bluetooth mesh network to which the present invention may be applied.

Referring to FIG. 11, the protocol stack of the mesh network includes a bearer layer 81, a network layer 82, a transport layer 83 and an application layer 84.

The bearer layer 81 defines a method in which a message is transmitted between nodes. That is, in the mesh network, the bearer layer determines a bearer to which a message is transmitted.

An advertising bearer and a GATT bearer for message transmission are present in the mesh network.

The network layer 82 defines a method of transferring a message to one or more nodes in the mesh network and defines the format of messages transmitted by the bearer layer 81.

Furthermore, the network layer 82 defines whether a message will be relayed or forwarded and a method of authenticating and encrypting network messages.

The transport layer 83 defines the encryption and authentication of application data by providing the confidentiality of an application message.

The application layer 84 defines a method, application Opcode and parameters related to how a high layer application will use the transport layer 73.

FIG. 12 is a flowchart showing an example of a method for joining, by a device to which the present invention may be applied, a Bluetooth mesh network.

In order for a new device or a non-provisioned device to join a mesh network, the new device or a non-provisioned device must experience a provisioning procedure.

The provisioning procedure means a procedure of authenticating a device that has not been authenticated and providing basic information (e.g., a unicast address and a variety of types of keys) for joining a mesh network.

That is, the provisioning procedure is a procedure for the provisioner (second device 400) of the mesh network to provide information for joining the mesh network.

Through the provisioning procedure, the first device 300 can obtain the address of the network, keys, a device identifier and a variety of types of information for operating as part of the mesh network.

The provisioning procedure includes an invitation step, an exchange public key step, an authentication step and the distribution of provisioning data step.

The provisioning procedure may be performed through a variety of types of bearers. For example, the provisioning procedure may be performed through an advertising-based bearer, a mesh provisioning service-based bearer or a mesh-based bearer.

The advertising-based bearer is an essentially established bearer. The provisioning service-based bearer or the mesh-based bearer may be used for a provisioning procedure if the advertising-based bearer does not support the advertising-based bearer or provisioning data cannot be transmitted through the advertising-based bearer.

The provisioning service-based bearer means a bearer through which provisioning data is exchanged through the GATT Protocol of existing Bluetooth LE. The mesh-based bearer means a bearer with which provisioning data can be exchanged over a mesh network if the first device 300 and the second device 400 are not located in the distance where data can be directly exchanged.

A procedure of establishing the advertising-based bearer is described later.

After the bearer is established between the first device 300 and the second device 400, the first device 300 may be provisioned through the following provisioning procedure.

Invitation Step

The invitation step is started as the second device 400 scans the first device 300. The first device transmits a beacon message to the second device 400 (S1210). The beacon message includes the UUID of the first device 300.

The second device 400 that has scanned the first device 300 through the beacon message transmits an invite message to the first device 300 (S1220).

The invite message asks the first device 300 whether it performs a provisioning procedure. If the first device 300 does not want to perform the provisioning procedure, it neglects the invite message.

If the first device 300 wants to perform the provisioning procedure, however, that is, if the first device attempts to join a mesh network, the first device 300 transmits a capability message in response to the invite message (S1230).

The capability message may include information indicating whether the first device 300 supports the setting of a security algorithm, a public key, information indicating whether a value can be output to a user, and information indicating whether a value can be received from a user.

Exchange Public Key Step

Thereafter, the second device 400 transmits a start message for a provisioning start to the first device 300 (S1240).

If a public key cannot be used using the out-of-band technology, the second device 400 and the first device 300 exchange public keys (S1250, S1260).

However, if a public key can be used using the out-of-band mechanism, the second device 400 may transmit an ephemeral public key to the first device 300 and read a static public key from the first device 300 using the out-of-band technology.

Thereafter, the second device 400 authenticates the first device 300 by performing an authentication procedure along with the first device 300 (S1270).

Distribution of Provisioning Data Step

When the first device 300 is authenticated, the second device 400 and the first device 300 calculate and generate a session key.

Thereafter, the second device 400 transmits provisioning data to the first device 300 (S1280).

The provisioning data may include an application key, a device key, a network key, IVindex, a unicast address, and so on.

The first device 300 that has received the provisioning data transmits a complete message in response to the provisioning data, and thus the provisioning procedure is terminated (S1290).

FIG. 13 is a diagram showing an example of a method of performing a scanning procedure on a surrounding device.

In order to provide a service through wireless communication, a user has to perform a scanning procedure on a user surrounding device through a specific device.

In this case, the specific device may mean any one of a user device and a user surrounding device.

However, if the specific device searches for a surrounding device using wireless communication, the specific device consumes a lot of power.

In particular, if many devices are present around the specific device, power consumption is much severe due to the scanning procedure of the specific device.

From a viewpoint of a single device, the configuration of a sensor network may be broken in addition to a power consumption problem.

As shown in FIG. 13, it is assumed that a function for another radio interface including BLE of another device and searching for an executable service through BLE communication has been implemented a specific device.

In FIG. 13, a device B may search for surrounding devices 1 to 4 and store the results of the search for each device in its GATT server.

That is, the results of the search may include supportable interface information of each device.

For example, it may be seen that the device 1 can support Bluetooth BR/EDR, and BLE, the device 2 can support Bluetooth BR/EDR, Wi-Fi, NFC, etc., and the device 3 can support Bluetooth BR/EDR and BLE.

Furthermore, the device A may read search result information stored by the device B.

However, the fact that search result information read by the device A from the device B by requesting information about surrounding devices from the device B is the latest information may not be guaranteed.

In order to obtain the latest search result information for a surrounding device when the device A wants the search result information, the device A may directly perform search for a surrounding device.

Alternatively, when the device A requests search result information from the device B, the device B may newly search for a surrounding device, may update search result information stored in the GATT server with the latest information, and may transfer the latest information to the device A.

However, in current Bluetooth communication, a mode, procedure and message for a function related to the scanning procedure of a surrounding device with respect to the device A and the device B have not yet been defined.

Accordingly, a mode of each device, a procedure between devices, and messages transmitted and received between devices in order to perform a method of searching for (or scanning) a surrounding device in Bluetooth communication, which proposed by this specification, are newly defined.

First, a scan-related procedure for a surrounding device proposed by this specification may include (1) a scan negotiation procedure and (2) a scan role authority procedure.

The scan role authority procedure may be a procedure included in the scan negotiation procedure in a great category.

Furthermore, the scan negotiation procedure may include 1) the exchange procedure of available parameters in each device in relation to the scan, 2) a procedure of transmitting/receiving a scan negotiation request message, 3) a procedure of transmitting/receiving a scan negotiation response message, 4) a procedure of transmitting/receiving a scan negotiation confirm message.

Furthermore, the scan role authority procedure is performed prior to the scan negotiation procedure, but is commonly performed when the scan negotiation request message is received.

Hereinafter, a detailed procedure related to a surrounding device scan procedure is described in detail with reference to related drawings.

FIG. 14 is a block diagram of each device for searching for a surrounding device and a conceptual diagram showing an example in which messages are transmitted/received between devices, which are proposed by this specification.

From FIG. 14, it may be seen that the block diagram has been divided into a step in which a device 1 and a device 2 negotiate that any one of them will perform a scan role and a step in which if the device 2 has been determined to perform the scan role, the device 2 obtains information of a device 3 (surrounding device) through a BLE interface.

FIG. 15 is a block diagram of each device for searching for a surrounding device and a conceptual diagram showing another example in which messages are transmitted/received between devices, which are proposed by this specification.

From FIG. 15, it may be seen that the block diagram has been divided into a step in which a device 2 and a device 3 negotiate that any one of them will perform a scan role and a step in which if the device 2 has been determined to perform the scan role, the device 2 obtains information of the device 3 through a BLE interface and notifies a device 1 of the information.

In FIG. 15, two or more connections are formed in Bluetooth LE and an external Interface between the device 2 and the device 3.

The reason for this is that the information provided from the device 3 to the device 2 is not limited to BLE-related information.

That is, this means that the device 2 can exchange external interface information (e.g., Wi-Fi) with the device 3.

FIG. 16 is a diagram showing an example of a method of performing search for a surrounding device using the scan function of another device and obtaining capability information of the retrieved surrounding device, which is proposed by this specification.

That is, FIG. 16 a diagram showing a method for a specific device to enable another device to perform search for a surrounding device of a specific device instead of the specific device using BLE.

From FIG. 16, it may be seen that if a BLE device A is a device having more advantageous scan than a BLE device B, the BLE device B obtains capability information of surrounding devices, that is, a scan target device #1 and a scan target device #2 through the BLE device A.

The reason why the device A has more advantageous scan than the device B may include several reasons.

For example, there is a case where the device A has less ongoing tasks than the device B or has higher computing power than the device B or has no limit to the use of energy resources because it is supplied with power.

Furthermore, both the scan target devices (devices #1 and #2) have BLE functions in the enable state and store information about services capable of being performed by them or available radio interfaces in their databases of BLE.

Referring to FIG. 16, when a user wants to obtain information about a surrounding device, the user instructs the device B to perform search for a surrounding device.

Thereafter, the device B performs a scan negotiation procedure along with the device A in order to check that which one of the device A and the device B is more suitable for performing scanning.

If the device A takes a scan role through the scan negotiation procedure, the device A performs search for a surrounding device.

Thereafter, the device A obtains information stored in the databases of the scan target devices #1 and #2 through the scan procedure, and transmits the results of the search including the obtained information to the device B.

FIG. 17 is a diagram showing another example of a method of performing search for a surrounding device using the scan function of another device and obtaining capability information of the retrieved surrounding device in BLE communication, which is proposed by this specification.

Referring to FIG. 17, a device A has been connected to scan target devices #1 and #2.

Specifically, the device A has been connected to the scan target device #1 through Bluetooth BR/EDR and has been connected to the scan target device #2 through Wi-Fi.

As shown in FIG. 17, a BLE device B may perform search for the scan target devices #1 and #2 and the BLE device A in response to a surrounding device search command from a user.

In this case, the BLE device A may perform a scan negotiation procedure along with the scan target device #2.

In this case, the BLE device A and the scan target device #2 may use BLE communication.

Referring to FIG. 17, the BLE device A takes a scan role.

Accordingly, the BLE device A obtains capability information for the scan target devices #1 and #2 and transmits the obtained capability information to the BLE device B.

Hereinafter, the scan role is described in detail.

FIG. 18 is a diagram showing an example of the type of scan role proposed by this specification.

Specifically, FIG. 18a is a diagram showing an example of a direct scan role, and FIG. 18b is a diagram showing an example of an indirect scan role.

The scan role proposed by this specification may be basically divided into (1) a direct scan role (D scan role) and (2) an indirect scan role (I scan role).

As in FIG. 18a, if a specific device takes a direct scan role, the specific device obtains information transmitted by surrounding devices by scanning an RF channel with respect to devices that have not been connected.

In contrast, as in FIG. 18b, if a specific device takes an indirect scan role, the specific device obtains information of a counterpart device through a connected data channel with respect to a connected device.

That is, the device #1 that takes the indirect scan role receives capability information of the device #2 from the device #2 through a data channel.

Furthermore, the "connection" in FIG. 18b may include the state in which 'mesh packets' considered in a BLE mesh network can be exchanged in addition to the exchange of packets through a data channel.

In this case, when a specific device enters the BLE mesh network as a member thereof, it may be said that BLE devices have been connected.

The capability information may include general candidate parameters. The general candidate parameters are described in detail later.

Furthermore, a device that instead performs scan which is used in this specification, that is, a device taking a scan role, may be expressed as or called a friend device.

FIG. 19 is a diagram showing yet another example of a method of searching for a surrounding device using the scan function of another device and obtaining information of the surrounding device, which is proposed by this specification.

FIG. 19a shows an example of an existing surrounding device search method, and FIGS. 19b and 19c show examples of a surrounding device search method proposed by this specification.

As shown in FIG. 19a, in a conventional technology, a user device owned by a user has a direct scan role (D scan role) and searches for surrounding devices (Device #1, #2 and #3).

That is, the user device transmits an advertising message the surrounding devices through advertising channels (e.g., 3), and receives a response including information of each of the surrounding devices from the surrounding devices through the advertising channels.

In contrast, FIG. 19b shows a method of scanning surrounding devices, which is proposed by this specification.

Referring to FIG. 19b, a user device takes an indirect scan role, and a device #4 BLE-connected to the user device takes a direct scan role (D scan role).

That is, in the case of FIG. 19b, the indirect scan role (I scan role) is not directly performed by the user device, but is handed over to the device #4 connected to the user device.

That is, the device #4 takes the scan role through the scan negotiation procedure between the user device and the device #4.

Thereafter, the device #4 obtains information of surrounding devices (Device #1, #2, #3) by performing RF channel scanning instead of the user device.

Thereafter, the device #4 notifies the user device of the obtained information about the surrounding devices.

In FIG. 19c, the device #1 has been connected to the device #2 (or at least one device) in a wired or wireless manner.

In this case, the user device takes a direct scan role (D scan role).

If the user device having the D scan role perform a discovery procedure, any one of the device #1 and the device #2 takes an I scan role.

The device (device #1) that has been determined to take the I scan role obtains information of a connected counterpart device.

Thereafter, the device #1 transmits capability information, including information of the device #2 and its own information, to the user device through a response message.

In this case, the device #1 and the device #2 determine a scan role for a surrounding device through a scan negotiation procedure (including a scan role authority procedure).

The scan role is determined based on a DSRA algorithm to be described later.

A mode, procedure, message and parameter for performing a search method on a surrounding device, which are proposed by this specification, may be defined as in Table 2 below.

TABLE 2

| Category | Description |
| --- | --- |
| Mode | The state in which a device has been set to perform a specific operation |
| Procedure | A series of procedures that need to be performed by a device in order to perform a specific function |
| Message | An operation for transmitting a parameter between devices |
| Parameter | A data value or setting value transferred to a counterpart through a message |

Table 3 is a table showing a detailed example of the mode, procedure, message, parameter defined in Table 2.

TABLE 3

| Name | Category | Description |
| --- | --- | --- |
| Scan Acceptable Mode | Mode | A mode in which a scan negotiation procedure is accepted |
| Non-scan Acceptable Mode | Mode | A mode in which a scan negotiation procedure is not accepted |
| Scan Role Authority Procedure | Procedure | A procedure of checking the authority of a counterpart device in order to determine whether a scan negotiation procedure will be accepted or not |
| Scan Negotiation Procedure | Procedure | A procedure of determining a scan role device, performing scanning and notifying a requested device of the results of the scan |
| Candidate Parameter | Parameter | Parameters that need to be considered in order to determine a scan role device |
| Available Parameter | Parameter | Parameters that belong to candidate parameters and that are available for a device |
| Selected Parameter | Parameter | Parameters determined to be used to determine a scan role by comparing the available parameters of two devices |
| Scan Role Assignment Value | Parameter | A value generated by each device in order to determine a scan role. A device that will perform scan is determined through a comparison between the values. |
| Authority Parameter | Parameter | A value used to determine whether a device is a device for which a scan negotiation procedure is to be accepted |
| Dynamic Scan Role Assignment | Algorithm | An algorithm used to determine a scan role assignment value |
| Bitmask of Available Parameter | Message | A message for transferring an available parameter. |
| Scan Negotiation Request | Message | In the case of a scan negotiation procedure 1: a message for transferring a scan role assignment value and requesting that scan will be performed by which one In the case of a scan negotiation procedure 2: a message for transferring information about available parameters requesting that scan will be performed by which one |
| Scan Negotiation Response | Message | Transfer a result of the comparison between scan role assignment value. A response message for a scan negotiation request |
| Scan Negotiation Confirm | Message | A message that determines which device will perform scan and requests a scanning operation |

A scan negotiation procedure proposed by this specification is described in more detail below.

FIGS. 20 and 21 are flowcharts showing examples of a scan negotiation procedure proposed by this specification.

That is, the scan negotiation procedure proposed by this specification may be divided into a scan negotiation procedure 1 of FIG. 20 and a scan negotiation procedure 2 of FIG. 21 depending on that a dynamic scan role assignment (DSRA) algorithm will be performed by which one of two devices or by both devices.

First, a case where the DSRA algorithm is performed by both devices is described with reference to FIG. 20.

A device 1 and a device 2 are in the BLE connection state (S2010).

The device 1 receives a scan request in response to a request from a user (S2020).

In this case, the device 2 is in the aforementioned scan acceptable mode.

Thereafter, the device 1 and the device 2 exchange pieces of required information in order to derive a scan role assignment value (S2030).

Thereafter, each of the device 1 and the device 2 performs a DSRA algorithm based on the exchanged information (S2040).

Thereafter, the two devices select a device that will perform a scan role through a comparison between the scan role assignment values obtained as the results of the execution of the DSRA algorithm.

Thereafter, the two devices exchange that the scan role device has been determined through a message (S2050).

In this case, the device selected to take the scan role performs a scanning operation on surrounding devices and transfers the results of the execution of the scanning to a device that has requested scanning.

Unlike in FIG. 20, FIG. 21 shows an example in which any one device performs a DSRA algorithm.

Referring to FIG. 21, only a device #2 performs the DSRA algorithm.

That is, the device #2 derives the scan role assignment values of the two device #1 and #2 and compares the derived values.

A subsequent process is the same as that of FIG. 20.

A method of determining a scan role after performing a DSRA algorithm is described in more detail below with reference to FIGS. 22 to 24.

FIG. 22 shows more detailed contents of FIG. 20, and FIGS. 23 and 24 are more detailed contents of FIG. 21.

FIG. 22 a diagram showing another example of a scan negotiation procedure proposed by this specification.

That is, FIG. 22 shows a method in which both devices perform a scan negotiation procedure by performing DSRA algorithms.

The scan negotiation procedure of FIG. 22 may basically include the step of (1) exchanging the bitmasks of device parameters, (2) transmitting/receiving a scan negotiation request message, (3) transmitting/receiving a scan negotiation response message, and (4) transmitting/receiving a scan negotiation confirm message.

First, the procedure of exchanging the bitmasks of device parameters is described.

A device 1 and a device 2 exchange pieces of information about the available parameters of the devices through a device parameter bitmask message (S2210).

That is, the device 1 obtains the information about the available parameters of the device 2, and the device 2 obtains the information about the available parameters of the device 1.

Thereafter, each of the devices selects at least one (specific) parameter of the obtained available parameters of a counterpart device.

Thereafter, the two devices calculate scan role assignment (SRA) values by performing DSRA algorithms using the selected parameters, respectively. (S2220, S2230).

A procedure of transmitting/receiving a scan negotiation request message is described below.

The device 1 transmits a scan negotiation request message, including the scan role assignment value, to the device 2 (S2240).

Thereafter, the device 2 determines that which one will perform a scan role by comparing the received SRA value of the device 1 with its calculated SRA value.

Furthermore, the device 1 may also transmit a request, including that scanning will be performed once or periodically, to the device 2 through the scan negotiation request message.

A procedure of transmitting/receiving a scan negotiation response message is described below.

The device 2 notifies the device 1 of a scan role determined through a comparison between SRA values as a response to the scan negotiation request (S2250).

That is, the device 1 can be aware that which device will perform scanning by receiving the scan negotiation response message from the device 2.

In the case of FIG. 22, if the scan role has been assigned to the device 2, the device 2 may perform scanning.

A procedure of transmitting/receiving a scan negotiation confirm message is described below.

The device 1 transmits a scan negotiation confirm message, including information that instructs the device 2 to perform a scanning operation or information checking that the scan role has been assigned to which device, to the device 2 (S2260).

Thereafter, the device 2 performs scanning on a surrounding device and transmits a result of the execution of the scanning, that is, information about the surrounding device, to the device 1 (S2270).

FIG. 23 is a diagram showing yet another example of a scan negotiation procedure proposed by this specification.

That is, FIG. 23 shows a method in which only one device performs a scan negotiation procedure by performing a DSRA algorithm.

FIG. 23 is an example in which a device 2 performs a D scan role.

The scan negotiation procedure of FIG. 23 may basically include (1) a procedure of transmitting/receiving a scan negotiation request, (2) a procedure of transmitting/receiving a scan negotiation response, and (3) a procedure of transmitting/receiving a scan negotiation confirm.

First, a device 1 transmits a scan negotiation request message, including information about its own available parameters, to a device 2 (S2310).

The scan negotiation request message may additionally include information regarding that scanning will be performed once or periodically.

In this case, the device 1 receives a scan request by a user input, and the device 2 is the scan acceptable mode.

Thereafter, the device 2 selects a specific parameter of the device 1 and the device 2 based on the received available parameters of the device 1.

Thereafter, the device 2 calculates the scan role assignment (SRA) values of the device 1 and the device 2 through the DSRA algorithm using the selected parameter.

Thereafter, the device 2 determines that which device will perform a scan role through a comparison between the calculated SRA values of the devices (S2320).

Thereafter, the device 2 transmits a scan negotiation response message to the device 1 as a response to the scan negotiation request (S2330).

The scan negotiation response message includes a result of the comparison of the SRA values and includes a result that which device has a scan role.

That is, which device of the device 1 and the device 2 will perform scanning can be aware through the scan negotiation response message.

If the device 2 has a D scan role, the device 2 performs scanning (S2350).

Thereafter, the device 1 instructs (commands) the device 2 to perform a scanning operation or transmits a scan negotiation confirm message for checking that the scan role has been assigned to which device (S2340).

In the case of FIG. 23, it may be seen that a direct scan role (D scan role) has been assigned to the device 2.

Accordingly, the device 2 performs scanning on a surrounding device and transmits a result of the execution of the scanning to the device 1 (S2360).

In this case, the transmission of a scan negotiation confirm message may be omitted.

FIG. 24 is a diagram showing yet another example of a scan negotiation procedure proposed by this specification.

Like FIG. 23, FIG. 24 shows a method in which only one device performs a scan negotiation procedure by performing a DSRA algorithm.

FIG. 24 is an example of a method for a device 2 to perform an indirect scan role (I scan role).

Step S2410 to step S2450 are the same as those of S2310 to S2350 of FIG. 23, and a detailed description thereof is omitted.

After step S2450, if the I scan role has been assigned to the device 2, the device 2 transmits a response, including information of the device 1 and its own information, to another device (S2460).

Hereinafter, the dynamic scan role assignment (DSRA) algorithm proposed by this specification is described in more detail below.

FIG. 25 is a diagram showing an example of a method of performing the DSRA algorithm proposed by this specification.

The DSRA algorithm may be defined as in Equation 1.

$$SRA = \sum_{n=1}^{Num(SPn)} (S_n \cdot SP_n), \quad \sum_{n=1}^{Num(S_n)} S_n = 1 \quad \text{[Equation 1]}$$

In Equation 1, $S_n$ indicates a scale factor, $CP_n$ indicates a candidate parameter, $AP_n$ indicate an available parameter, and $SP_n$ indicates a selected parameter.

Furthermore, the scan role assignment (SRA) value is a value for determining a scan role, and a device compares the large and small of an SRA value and assigns a scan role to one of two devices.

The DSRA algorithm is described with reference to FIG. 25 and Equation 1. Each device selects available parameters of candidate parameters.

Thereafter, the two devices exchange the selected available parameters, compare the available parameters of a counterpart device with its own available parameters, and select selected parameters.

Thereafter, the selected parameters are multiplied by a scale factor, the multiplied values are added up, and an SRA value is calculated or determined through ascending or descending operation.

In this case, the selected parameter value may be directly multiplied by the scale factor. If the selected parameters vary over time, a moving average may be performed.

The candidate parameters described in FIG. 25 are described in more detail below.

First, the candidate parameters may be classified as in Table 4.

TABLE 4

| Name | Description |
| --- | --- |
| General candidate parameter | An environment value of a device |
| Functional candidate parameter | A value obtained by digitizing the suitability of a scan role by taking into consideration a user use case and setting |

The candidate parameter of Table 4 indicates a value that gives an influence on that how much is a device suitable for performing scanning.

For example, the "remained energy" of the candidate parameters is a parameter indicative the amount of remaining battery power in a device.

A device having a large amount of remaining battery power has no problem compared to a device having a small amount of remaining battery power although it performs scanning.

That is, it may be seen that a device having a large amount of remaining battery power is more suitable for performing scanning.

The candidate parameter is divided into the general candidate parameter and the functional candidate parameter as in Table 4.

The general candidate parameter is a parameter indicative of an input value for enabling a device capable of performing a high computation and complex function to perform a scan role by taking into consideration the remained energy and computational ability of each device.

Table 5 is a table showing an example of the general candidate parameters of Table 4.

TABLE 5

| | Parameters | Description |
| --- | --- | --- |
| $CP_1$ | Remained Energy | The amount of remaining battery power in a device<br>A high value is indicated as the amount of remaining battery power is higher |
| $CP_2$ | Supplied Power Method | Whether power is always supplied through an adaptor, etc.<br>Set to be higher than the highest value of the amount of remaining battery power when power is always supplied |
| $CP_3$ | Assigned Computing Resource | An average of marginal computing resources currently remaining in a CPU, memory, etc.<br>An average value during a recent t time |
| $CP_4$ | Number of connections | The number of currently connected devices<br>It is difficult to perform a scan role because the number of time slots capable of performing scan is insufficient as the number of currently connected devices is large |
| $CP_5$ | Role Value | A parameter value according to the role of a device<br>Differently assign a parameter for each type of device (e.g., TV/Phone/PC)<br>Differently assign a parameter for each type according to the operational role of a device (e.g., Master) |
| $CP_6$ | Manufacturer define | Defined by a manufacturer<br>Pre-Fixed Value |
| ... | | |
| $CP_n$ | Message | |

Table 6 is a table showing an example of the functional candidate parameters of Table 4.

TABLE 6

| | Use Case | Device Type | Recommended Parameter Value |
| --- | --- | --- | --- |
| $CP_1$ | If one device performs scan periodically and continuously and continues to update search result information for surrounding device and a user wants to know the contents thereof | Device A<br>Device B | Low<br>High |
| $CP_2$ | If a user wants to scan a surrounding device once | Device A<br>Device B | Middle<br>Middle |

TABLE 6-continued

| Use Case | | Device Type | Recommended Parameter Value |
|---|---|---|---|
| $CP_3$ | If two devices are to be connected using a user device. When one of the two devices is a device B | Device A Device B | Low High |
| $CP_4$ | When there are many surrounding search target devices | Device A Device B | Low High |
| $CP_5$ | If a user-define value is to be input | Device A Device B | Middle Middle |
| ... | | | |
| $CP_n$ | | | |

The environment data defined as the general candidate parameters, such as Table 5, may not be perfect in terms of efficiency of scan role setting because a use case, etc. is not taken into consideration.

Accordingly, in order to take into consideration more perfect scan role setting, the functional candidate parameters, such as Table 6, are additionally defined.

As in FIG. 26, a device may be basically divided into three types below.

FIG. 26 is an example of a concept for illustrating a functional candidate parameter proposed by this specification.

A user device (device A) that is directly used by a user and that requests search A device (device B) that performs a scan negotiation procedure along with a user device A device (device C) corresponds to a target of search In FIG. 26, it is assumed that there are two use cases, including a use case 1 in which a user search for the device C once using the device A and a use case 2 in which a user continues to perform search 100 times using the device A.

In the case of the use case 1, when a scan role is determined, there is no problem if only the general candidate parameters are taken into consideration.

However, in the case of the use case 2, it is not efficient if the device A is set as a scan role if only the general candidate parameters are taken into consideration.

Accordingly, since such various use cases may occur, the functional candidate parameters are defined as in Table 6 in order to prevent a change in the scan role.

Hereinafter, the bitmask-of-available parameter message of the available parameters is described in more detail below with reference to FIGS. 27a and 27b.

FIG. 27a is a diagram showing an example of a bitmask message format proposed by this specification, and FIG. 27b is a diagram showing an example of a method of transmitting and receiving the bitmask message of FIG. 27a between devices.

That is, a message for exchanging the available parameters between two devices is a bitmask messages shown in FIG. 27a as an example.

That is, each device transfers a parameter that belongs to the aforementioned candidate parameters and that may be used by the corresponding device to a counterpart device in the form of a message format, such as FIG. 27a.

Referring to FIG. 27a, it may be seen that the second, third, fourth and sixth bits of the bitmask message format have been set to '1'.

This indicates that a device can calculate a scan role assignment value by taking into consideration a supplied power method, an assigned computing resource, the number of connections and a user-define value.

A scan acceptable mode and a non-scan acceptable mode proposed by this specification is described below.

A surrounding device scan method proposed by this specification is to determine whether scanning will be performed or not in response to a request from another device, and is sensitive to an authority problem.

Accordingly, a device may set modes, such as Table 7, and may accept or not accept a scan negotiation procedure.

TABLE 7

| Mode Name | Description |
|---|---|
| Scan acceptable mode | A mode in which a scan negotiation procedure is accepted |
| Non-scan acceptable mode | A mode in which a scan negotiation procedure is not accepted |

If the scan acceptable device is a device that accepts a scan negotiation procedure with a specific device, it does not unconditionally accept the scan request of the specific device That is, the scan acceptable device may perform a procedure of filtering whether the specific device is a device for which the scan negotiation procedure can be accepted or a device for which the scan negotiation procedure cannot be accepted by performing a scan role authority procedure along with the specific device.

In this case, the scan role authority procedure is a procedure performed prior to the scan negotiation procedure, but is performed if there is a request for determining a scan role, such as a scan negotiation request message.

Through the scan role authority procedure, two devices exchange authority parameters and determine whether or not to perform the scan negotiation procedure with a counterpart device.

Furthermore, the authority parameter of each device may be changed depending on the aforementioned use case.

FIG. 28 is a flowchart showing an example of a method of performing a scan role authority procedure proposed by this specification.

A method of performing a scan role assignment procedure between two devices, which is proposed by this specification, is described below by taking a phone and TV as examples.

FIG. 29 is a flowchart showing an example of a scan role assignment procedure proposed by this specification.

The phone may be expressed as a device 1, and the TV may be expressed as a device 2.

In FIG. 29, it is assumed that a user gives an instruction to the phone once every 10 seconds so that the phone searches for surrounding devices using the phone.

First, the phone receives an input for a scan request from the user.

The input for the scan request may be performed when the user presses the search button of the phone (a surrounding device).

However, the present invention is not limited thereto, and the phone may receive the scan request if a specific requirement is satisfied.

Thereafter, the phone performs a scan negotiation procedure along with the TV.

In this case, Bluetooth communication has been connected between the phone and the TV, and the TV is the scan acceptable mode.

That is, it is assumed that the two devices have been confirmed that the phone is a device that may request scanning from the TV through the aforementioned scan authority procedure.

Thereafter, the phone and the TV exchange their available parameters through an available parameter bitmask message (S2910).

Thereafter, the two device select selectable parameters through the exchanged available parameters (S2920) and calculate respective SRA values (S2930).

From the table of FIG. 29, it may be seen that the phone has the remained energy of '3' because the amount of remaining batter power is not so high, thus the SRA value of the phone is '3', and the SRA value of the TV is '12'.

That is, it may be seen that the final SRA value of the phone is smaller than that of the TV.

Thereafter, the phone transfers its SRA value to the TV through a scan negotiation request message (S2940).

Thereafter, the TV checks the SRA value of the phone, and notifies the phone of a result determined to indicate that it is more suitable for performing a scan role than the phone through a scan negotiation response message (S2950).

Thereafter, the phone transmits a scan negotiation confirm message for providing notification that the TV will perform the scan role to the TV (S2960).

As described above, the scan negotiation confirm message may be omitted.

Thereafter, the TV performs scanning on surrounding devices once every 10 seconds and transmits a result of the execution of the scanning to the phone (S2970).

The authority parameter proposed by this specification is described in detail below.

FIG. 30 is a diagram showing whether a scanning request is possible according to an authority parameter, which is proposed by this specification.

The authority parameter defined in this specification has information for determining whether a specific device has an authority or right to request a scan role negotiation.

For example, an example in which a parameter related to the authority has been set as 'Authority: 2727-0017-0021-03' is described.

The indication of the 'Authority: 2727-0017-0021-03' is a value indicative of the setting of a user.

The setting of the user is information indicating whether the user has set a device so that the device accepts a scanning request.

In the 'Authority: 2727-0017-0021-03', the value '2727' is information indicating whether the device of the user has been registered or not.

If the device is a device registered by the user regardless of a scanning request level value '0017' and a product group value '0021' to be described later, the device accepts a scanning request.

Next, in the 'Authority: 2727-0017-0021-03', the value '0017' indicates a scanning request level.

A device that requests scanning may make a scanning request from a device having a 'scanning request level value' lower than the device that requests scanning.

If a scanning request from a specific device is to be not accepted, the scanning request level value has only to be increased to a specific value.

Next, in the 'Authority: 2727-0017-0021-03', the value '0021' indicates a product group.

A phone may request scanning from TV, a lamp and headset devices, but cannot request a scanning request from other phones belonging to the same product group.

Next, in the 'Authority: 2727-0017-0021-03', the value '03' indicates contents related to security.

The contents related to security are information indicative of a value regarding that a scan role negotiation request will be accepted if wireless communication of which strength is used.

That is, a specific device sets the authority parameters based on the setting of a user, that is, information, such as 'whether the user of the user has been registered', a 'scanning request level' and a 'product group', and determines authority by comparing the value with that of another device.

Referring to FIG. 30, a device A may request scanning from a device B and a device C.

However, when the device A requests scanning from a device D and a device E, the scanning request is denied through a scan authority procedure.

The device B and the device C have been registered by a user and have been assigned the value '2727' by the setting of the user.

Furthermore, both the device B and the device C have lower scanning request level values than the device A, have respective product group values of '0077' and '0099', and belong to a product group from which the device A can request scanning.

In contrast, the device D has a higher scanning request level of '1111' than the device A.

Furthermore, the device E has a product group of '0021' and belongs to the same product group as the device A, and thus the device A cannot request scanning from the device E.

An operation of changing an authority parameter based on the aforementioned contents is described below.

FIG. 31 is a conceptual diagram showing an example of an operation of changing an authority parameter, which is proposed by this specification.

First, it is assumed that the phone (agent device) of a user B cannot search for a projector, corresponding to a scan target device, using the notebook device of a user A based on the authority parameter.

When the notebook device and the agent device entire a meeting room, an authority parameter management sensor disposed in the meeting room requests the notebook device of the user A to change a current authority parameter value.

If the notebook device of the user A agrees with the authority parameter change request, the agent device (the phone of the user B) may make a scanning request from the notebook device of the user A.

In this case, although an authority parameter management sensor is not present, the agent device of the user B may directly request a change of the authority parameter from the notebook device of the user A.

Thereafter, when the notebook device of the user A exits from the meeting room, the changed authority parameter of the notebook device returns to a value prior the change.

Alternatively, the user A may directly return the authority parameter of the notebook device to a value prior to the change.

FIG. 32 is a diagram showing an example of the scanning procedure of a surrounding device, which is proposed by this specification.

As shown in FIG. 32, it is assumed that a user has carried various devices or has attached them to his or her body.

In this case, the user randomly selects a device that belongs to the various devices and that will search for surrounding devices, and searches for surrounding devices using the selected device.

In this case, the selected device corresponds to a device that belongs to the devices carried by the user and that is most suitable for scan.

Which device is most suitable for scan may be determined using the aforementioned general candidate parameter, the functional candidate parameter, etc.

In FIG. 32, connections have been formed between a phone, a band, shoes and glasses.

A device that belongs to the phone, the band, the shoes and the glasses and that is most suitable for scanning surrounding devices may be selected based on the aforementioned parameters, etc. or may be selected by the user.

In FIG. 32, it may be seen that the band has been selected for the scanning of surrounding devices (S3210).

In this case, the band searches for surrounding devices when a scan request is received through the phone (S3220).

The scan request may be performed when the user presses a search button related to (surrounding device) scanning in the phone.

The surrounding devices may include TV, a Bluetooth headset, a projector, and a printer.

That is, the band takes a scan role, and obtains information about the surrounding devices by searching for the surrounding devices.

In this case, a procedure for the band to obtain the information by searching for the surrounding devices may be performed using the aforementioned scanning procedure (advertising, scanning) of BLE.

Thereafter, the band transfers the obtained information about the surrounding devices to the phone.

FIG. 33 is a diagram showing another example of the scanning procedure of a surrounding device, which is proposed by this specification.

FIG. 33 shows a specific floor in a large shopping mall or a large mart.

A plurality of stores has been located in the specific floor. A Bluetooth device (a beacon, etc., 3310) equipped with a Bluetooth module is disposed on the front side (close to a passage through which persons go) of each store.

Each Bluetooth device may include information about each store.

Furthermore, an agent device (e.g., an AP, 3320) capable of communicating with the Bluetooth devices of the stores is present in some area of the specific floor.

In this case, the agent device refers to a device that manages the Bluetooth devices, that is, the beacons.

The agent device may search for the Bluetooth devices of the stores and obtain information about the retrieved devices.

Accordingly, when a user who has worn a band 3330 enters the specific floor, the band may obtain information about surrounding stores from an agent device that takes a scan role through a scan negotiation procedure along with the agent device depending on its location.

The agent device may perform the D scan role or the I scan role.

That is, reference is made to the aforementioned contents for a detailed scan negotiation procedure between the band and the agent.

FIG. 34 is a diagram showing another example of the scanning procedure of a surrounding device, which is proposed by this specification.

Referring to FIG. 34, TV has been connected to a set-top box.

A phone performs a scanning procedure on surrounding devices by receiving a scan request (through a user input).

FIG. 34 shows a case where the phone obtains information of the set-top box through the TV.

That is, the TV and the set-top box determine a scan role through the aforementioned scan negotiation procedure.

The TV has been selected as a scan role. In this case, the TV obtains capability information of the set-top box.

The phone receives a response from surrounding devices including the TV.

In particular, the response transmitted from the TV to the phone includes both information of the TV and information of the set-top box.

Furthermore, although the drawings have been divided and described for convenience of description, the embodiments described with reference to the drawings may be merged to implement a new embodiment. Furthermore, to design a computer-readable recoding medium on which a program for executing the aforementioned embodiments has been recorded according to the needs of those skilled in the art falls within the scope of the present invention.

The direction-based device search method according to this specification are not limited and applied to the apparatuses and methods according to the embodiments described above, and some or all of the aforementioned embodiments may be selectively combined and configured so that the embodiments are modified in various manner.

Meanwhile, the direction-based device search method of this specification may be implemented in a processor-readable recording medium included in a network device, in the form of processor-readable code. The processor-readable recording medium includes all types of recording devices in which data readable by a processor is stored. The processor-readable recording medium may include ROM, RAM, CD-ROM, magnetic tapes, floppy disks, and optical data storage devices, for example. Furthermore, the processor-readable recording medium may be implemented in the form of carrier waves, such as transmission through the Internet. Furthermore, the processor-readable recording medium may be distributed to computer systems connected over a network, and the processor-readable code may be stored and executed in a distributed manner.

Furthermore, although the preferred embodiments of this specification have been illustrated and described above, this specification is not limited to the aforementioned specific embodiments, and a person having ordinary skill in the art to which this specification pertains may modify the present invention in various ways without departing from the gist of the claims. Such modified embodiments should not be individually interpreted from the technical spirit or prospect of this specification.

Furthermore, in this specification, both the apparatus invention and the method invention have been described, but the descriptions of both the inventions may be complementally applied, if necessary.

INDUSTRIAL APPLICABILITY

This specification is to use a method of performing scanning in a wireless communication system.

The invention claimed is:

1. A method of performing scanning by a first device in a wireless communication system, the method comprising:
receiving a scan request for at least one neighboring device; and
performing a scan negotiation procedure with a second device,
wherein the scan negotiation procedure comprises:
exchanging scan role assignment parameters related with a determination of a scan role device to perform a scan role with the second device;
determining the scan role device to perform the scan role based on the scan role assignment parameters; and
obtaining capability information on the at least one neighboring device from the scan role device,
wherein the exchanging scan role assignment parameters with the second device comprises:
exchanging candidate parameters related with scanning; and
exchanging available parameters used for the scanning among the candidate parameters,
wherein the candidate parameters are divided into a general candidate parameter and a functional candidate parameter,
wherein the general candidate parameter is related with an environment value of the scan role device, and
wherein the functional candidate parameter is related with at least one of a user condition and a user setting.

2. The method of claim 1, wherein:
the scan role device is determined based on a dynamic scan role assignment (DSRA) algorithm, and
the DSRA algorithm comprises:
selecting a specific parameter of the exchanged available parameters;
calculating a scan role assignment value by multiplying the selected specific parameter by a scale factor; and
determining the scan role device based on the calculated scan role assignment value.

3. The method of claim 1, wherein the general candidate parameter is information related to an amount of remaining battery power of the scan role device, a supplied power method, allocated computing resources, a number of currently connected devices, a role value related to a role of the scan role device or a manufacturer.

4. The method of claim 1, further comprising performing a scan role authority procedure with the second device in order to determine whether or not to perform the scan negotiation procedure.

5. The method of claim 4, wherein the scan role authority procedure comprises a step of exchanging authority parameters related to a scan role authority with the second device.

6. The method of claim 5, wherein the authority parameter is set as a first parameter related to a registration of a user device, a second parameter related to a scan request level, a third parameter related to a product group of the scan role device or a fourth parameter related to security.

7. The method of claim 6, wherein the scan negotiation procedure is performed when the second parameter of the first device is lower than the second parameter of the second device and the third parameter of the first device is different from the third parameter of the second device.

8. The method of claim 4, wherein:
the scan negotiation procedure further comprises a step of transmitting a scan role request message to the second device, and
the scan role authority procedure is performed after transmitting the scan role request message.

9. The method of claim 1, wherein the scan negotiation procedure is performed when a mode of the second device is set as a scan acceptable mode.

10. The method of claim 1, wherein:
the scan role comprises a direct scan role and an indirect scan role,
the direct scan role obtains the capability information on the at least one neighboring device by scanning a radio frequency (RF) channel in a non-connection state with the at least one neighboring device, and
the indirect scan role obtains the capability information on the at least one neighboring device using a data channel in a connection state with the at least one neighboring device.

11. The method of claim 1, further comprising a step of transmitting a scan negotiation confirm message for checking the scan role device to perform the scan role to the second device.

12. A first device for performing scanning in a wireless communication system, the first device comprising:
a transceiver; and
a processor functionally connected to the transceiver,
wherein the processor is configured to:
control the transceiver to receive a scan request for at least one neighboring device, and
perform a scan negotiation procedure with a second device,
wherein the scan negotiation procedure comprises:
exchanging scan role assignment parameters related with a determination of a scan role device with the second device;
determining the scan role device to perform scan role based on the scan role assignment parameters; and
obtaining capability information on the at least one neighboring device from the scan role device,
wherein the exchanging scan role assignment parameters with the second device comprises:
exchanging candidate parameters related with scanning; and
exchanging available parameters used for the scanning among the candidate parameters,
wherein the candidate parameters are divided into a general candidate parameter and a functional candidate parameter,
wherein the general candidate parameter is related with an environment value of the scan role device, and
wherein the functional candidate parameter is related with at least one of a user condition and a user setting.

* * * * *